US012739011B2

(12) United States Patent
Zorgui et al.

(10) Patent No.: US 12,739,011 B2
(45) Date of Patent: Sep. 15, 2026

(54) TARGET PATH BASED BEAM MEASUREMENT AND REPORT

(71) Applicant: QUALCOMM Incorporated, San Diego, CA (US)

(72) Inventors: Marwen Zorgui, San Diego, CA (US); Alexandros Manolakos, Athens (GR); Srinivas Yerramalli, San Diego, CA (US); Mohammed Ali Mohammed Hirzallah, San Marcos, CA (US); Min Huang, Beijing (CN); Jing Dai, Beijing (CN); Peter Gaal, San Diego, CA (US); Wanshi Chen, San Diego, CA (US); Danlu Zhang, San Diego, CA (US); Mingxi Yin, Beijing (CN); Chao Wei, Beijing (CN); Hao Xu, Beijing (CN); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 18/847,397

(22) PCT Filed: Jun. 6, 2022

(86) PCT No.: PCT/CN2022/097071

§ 371 (c)(1),
(2) Date: Sep. 16, 2024

(87) PCT Pub. No.: WO2023/236005

PCT Pub. Date: Dec. 14, 2023

(65) Prior Publication Data

US 2025/0219705 A1 Jul. 3, 2025

(51) Int. Cl.
*H04B 7/06* (2006.01)
*G01S 7/00* (2006.01)
(Continued)

(52) U.S. Cl.
CPC .......... *H04B 7/06952* (2023.05); *G01S 7/006* (2013.01); *G01S 13/003* (2013.01);
(Continued)

(58) Field of Classification Search
CPC H04B 7/06952; H04B 7/0632; H04B 7/1855; H04B 17/328; H04B 7/088; H04W 24/10; G01S 7/006; G01S 13/003
See application file for complete search history.

(56) References Cited

U.S. PATENT DOCUMENTS 10,958,325 B1 3/2021 Park
2022/0026550 A1 * 1/2022 Park ...................... G01S 13/003
(Continued)

FOREIGN PATENT DOCUMENTS

WO 2021248298 12/2021
WO 2022081510 4/2022
WO 2022107050 A1 5/2022

OTHER PUBLICATIONS

Huawei, et al., "Discussion on Downlink Beam Measurement and UE Reporting Procedure", 3GPP TSG RAN WG1 NR Ad hoc Meeting, R1-1700039, Spokane, USA Jan. 16-20, 2017, pp. 1-10, The whole document.
(Continued)

*Primary Examiner* — Angela Widhalm De Rodriguez
(74) *Attorney, Agent, or Firm* — Weaver Austin Villeneuve & Sampson LLP/QUALCOMM Incorporated

(57) ABSTRACT

Radio frequency (RF) sensing of a target object by a wireless network is supported by a sensing node based on a sensing-purpose beam measurement configuration and/or valid reporting configuration received from a network node. Based on the sensing-purpose beam measurement configuration, the sensing node measures sensing-purpose beams received from a transmitting entity and selects one or more
(Continued)

of the sensing-purpose beams for sensing the target. The sensing node sends a sensing-purpose beam measurement report to a network node that identifies the selected sensing-purpose beams and may provide measured metrics, such as signal strength and absolute or relative delay of the selected beams along the target paths. The sensing node may determine whether valid reporting conditions are present based on changes in the measurement the channel state information and may report sensing measurement if valid reporting conditions exist.

30 Claims, 12 Drawing Sheets

(51) Int. Cl.

| | |
|---|---|
| ***G01S 13/00*** | (2006.01) |
| ***H04B 7/08*** | (2006.01) |
| ***H04B 7/185*** | (2006.01) |
| ***H04B 17/318*** | (2015.01) |
| ***H04W 24/10*** | (2009.01) |

(52) U.S. Cl.
CPC ........... *H04B 7/0632* (2013.01); *H04B 7/088* (2013.01); *H04B 7/1855* (2013.01); *H04B 17/328* (2023.05); *H04W 24/10* (2013.01)

(56) References Cited

U.S. PATENT DOCUMENTS

| | | | | |
|---|---|---|---|---|
| 2023/0076874 | A1* | 3/2023 | Jeon | G01S 7/021 |
| 2025/0175240 | A1* | 5/2025 | Ren | H04B 7/06952 |
| 2025/0212079 | A1* | 6/2025 | Huang | H04W 36/30 |

OTHER PUBLICATIONS

International Search Report and Written Opinion—PCT/CN2022/097071—ISA/EPO—Dec. 21, 2022.

Supplementary European Search Report—EP22945155—Search Authority—Munich—Feb. 18, 2026.

* cited by examiner

TARGET PATH BASED BEAM MEASUREMENT AND REPORT

RELATED APPLICATIONS

This application claims the benefit of and is a National Phase entry of International Application No. PCT/CN2022/097071, filed Jun. 6, 2022, entitled "TARGET PATH BASED BEAM MEASUREMENT AND REPORT," which is assigned to the assignee hereof, and incorporated herein in its entirety by reference.

BACKGROUND

Field

Subject matter disclosed herein relates generally to wireless communication, and more specifically, to radio frequency sensing in a wireless communication system.

Information

Radar is a ranging technique that can be used to determine the distances of objects relative to a given location. A radar system operates by transmitting and receiving electromagnetic pulses. Some of the pulses reflect off objects or surfaces along the transmission path, producing "echoes." The radar system may determine the distances of the objects or surfaces based on a round trip time between the transmission of a pulse to the reception of an echo of that pulse.

In a mono-static radar system, the antennas used to transmit the pulses ("transmit antennas") are collocated with the antennas used to receive the echoes ("receive antennas"). For example, the transmit antennas and receive antennas are often disposed on the same device. This allows for simple synchronization between the timing of the transmitted pulses and the timing of the received echoes since the same device (or system) clock may be used for both. In a multi-static radar system, the transmit antennas are located a substantial distance away from the receive antennas. The spatial diversity afforded by multi-static radar systems provides a high accuracy of target location and allows different aspects of a target to be viewed simultaneously.

Radio frequency (RF) sensing is a technique, similar to (and may include) radar, that can be used to determine one or more of the presence, location, identity, or combination thereof of objects. RF sensing, for example, may be used in wireless communication systems, such as cellular communications system (5G and 5G beyond). With a large bandwidth allocated to, e.g., 5G and 5G beyond, cellular communications system RF sensing may be considered a critical feature in future cellular systems. Improvements for RF sensing are desired.

SUMMARY

Radio frequency (RF) sensing of a target object by a wireless network is supported by a sensing node based on a sensing-purpose beam measurement configuration and/or valid reporting configuration received from a network node. Based on the sensing-purpose beam measurement configuration, the sensing node measures sensing-purpose beams received from a transmitting entity and selects one or more of the sensing-purpose beams for sensing the target. The sensing node sends a sensing-purpose beam measurement report to a network node that identifies the selected sensing-purpose beams and may provide measured metrics, such as signal strength and absolute or relative delay of the selected beams along the target paths. The sensing node may determine whether valid reporting conditions are present based on changes in the measurement the channel state information and may report sensing measurement if valid reporting conditions exist.

In one implementation, a method performed by a sensing node in a wireless network for supporting radio frequency (RF) sensing a target in the wireless network, includes receiving from a network node in the wireless network a sensing-purpose beam measurement configuration; measuring a plurality of sensing-purpose beams received from a transmitting entity; selecting one or more sensing-purpose beams for sensing the target from the plurality of sensing-purpose beams based on at least the sensing-purpose beam measurement configuration; and sending a sensing-purpose beam measurement report to the network node or a different network node, the sensing-purpose beam measurement report comprising at least an identification of each of the one or more selected sensing-purpose beams.

In one implementation, a sensing node in a wireless network configured for supporting radio frequency (RF) sensing a target in the wireless network, includes a wireless transceiver configured to communicate with entities in the wireless network; at least one memory; and at least one processor coupled to the wireless transceiver and the at least one memory and configured to: receive, via the wireless transceiver, from a network node in the wireless network a sensing-purpose beam measurement configuration; measure a plurality of sensing-purpose beams received from a transmitting entity; select one or more sensing-purpose beams for sensing the target from the plurality of sensing-purpose beams based on at least the sensing-purpose beam measurement configuration; and send, via the wireless transceiver, a sensing-purpose beam measurement report to the network node or a different network node, the sensing-purpose beam measurement report comprising at least an identification of each of the one or more selected sensing-purpose beams.

In one implementation, a sensing node in a wireless network configured for supporting radio frequency (RF) sensing a target in the wireless network, includes means for receiving from a network node in the wireless network a sensing-purpose beam measurement configuration; means for measuring a plurality of sensing-purpose beams received from a transmitting entity; means for selecting one or more sensing-purpose beams for sensing the target from the plurality of sensing-purpose beams based on at least the sensing-purpose beam measurement configuration; and means for sending a sensing-purpose beam measurement report to the network node or a different network node, the sensing-purpose beam measurement report comprising at least an identification of each of the one or more selected sensing-purpose beams.

In one implementation, a non-transitory storage medium including program code stored thereon, the program code is operable to configure at least one processor in a sensing node in a wireless network for supporting radio frequency (RF) sensing a target in the wireless network, the program code comprising instructions to: receive from a network node in the wireless network a sensing-purpose beam measurement configuration; measure a plurality of sensing-purpose beams received from a transmitting entity; select one or more sensing-purpose beams for sensing the target from the plurality of sensing-purpose beams based on at least the sensing-purpose beam measurement configuration; and send a sensing-purpose beam measurement report to the network node or a different network node, the sensing-purpose beam measurement report comprising at least an identification of each of the one or more selected sensing-purpose beams.

In one implementation, a method performed by a network node in a wireless network for supporting radio frequency (RF) sensing a target in the wireless network, includes generating sensing-purpose beam measurement configuration for a sensing node in the wireless network; sending the sensing-purpose beam measurement configuration to the sensing node enabling the sensing node to select, from a plurality of received sensing-purpose beams, one or more sensing-purpose beams; and receiving a sensing-purpose beam measurement report from the sensing node, the sensing-purpose beam measurement report comprising at least an identification of each of one or more selected sensing-purpose beams.

In one implementation, a network node in a wireless network configured for supporting radio frequency (RF) sensing a target in the wireless network, includes an external interface configured to communicate with entities in the wireless network; at least one memory; and at least one processor coupled to the external interface and the at least one memory and configured to: generate sensing-purpose beam measurement configuration for a sensing node in the wireless network; send, via the external interface, the sensing-purpose beam measurement configuration to the sensing node enabling the sensing node to select, from a plurality of received sensing-purpose beams, one or more sensing-purpose beams; and receive, via the external interface, a sensing-purpose beam measurement report from the sensing node, the sensing-purpose beam measurement report comprising at least an identification of each of one or more selected sensing-purpose beams.

In one implementation, a network node in a wireless network configured for supporting radio frequency (RF) sensing a target in the wireless network, includes means for generating sensing-purpose beam measurement configuration for a sensing node in the wireless network; means for sending the sensing-purpose beam measurement configuration to the sensing node enabling the sensing node to select, from a plurality of received sensing-purpose beams, one or more sensing-purpose beams; and means for receiving a sensing-purpose beam measurement report from the sensing node, the sensing-purpose beam measurement report comprising at least an identification of each of one or more selected sensing-purpose beams.

In one implementation, a non-transitory storage medium including program code stored thereon, the program code is operable to configure at least one processor in a network node in a wireless network for supporting radio frequency (RF) sensing a target in the wireless network, the program code comprising instructions to: generate sensing-purpose beam measurement configuration for a sensing node in the wireless network; send the sensing-purpose beam measurement configuration to the sensing node enabling the sensing node to select, from a plurality of received sensing-purpose beams, one or more sensing-purpose beams; and receive a sensing-purpose beam measurement report from the sensing node, the sensing-purpose beam measurement report comprising at least an identification of each of one or more selected sensing-purpose beams.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
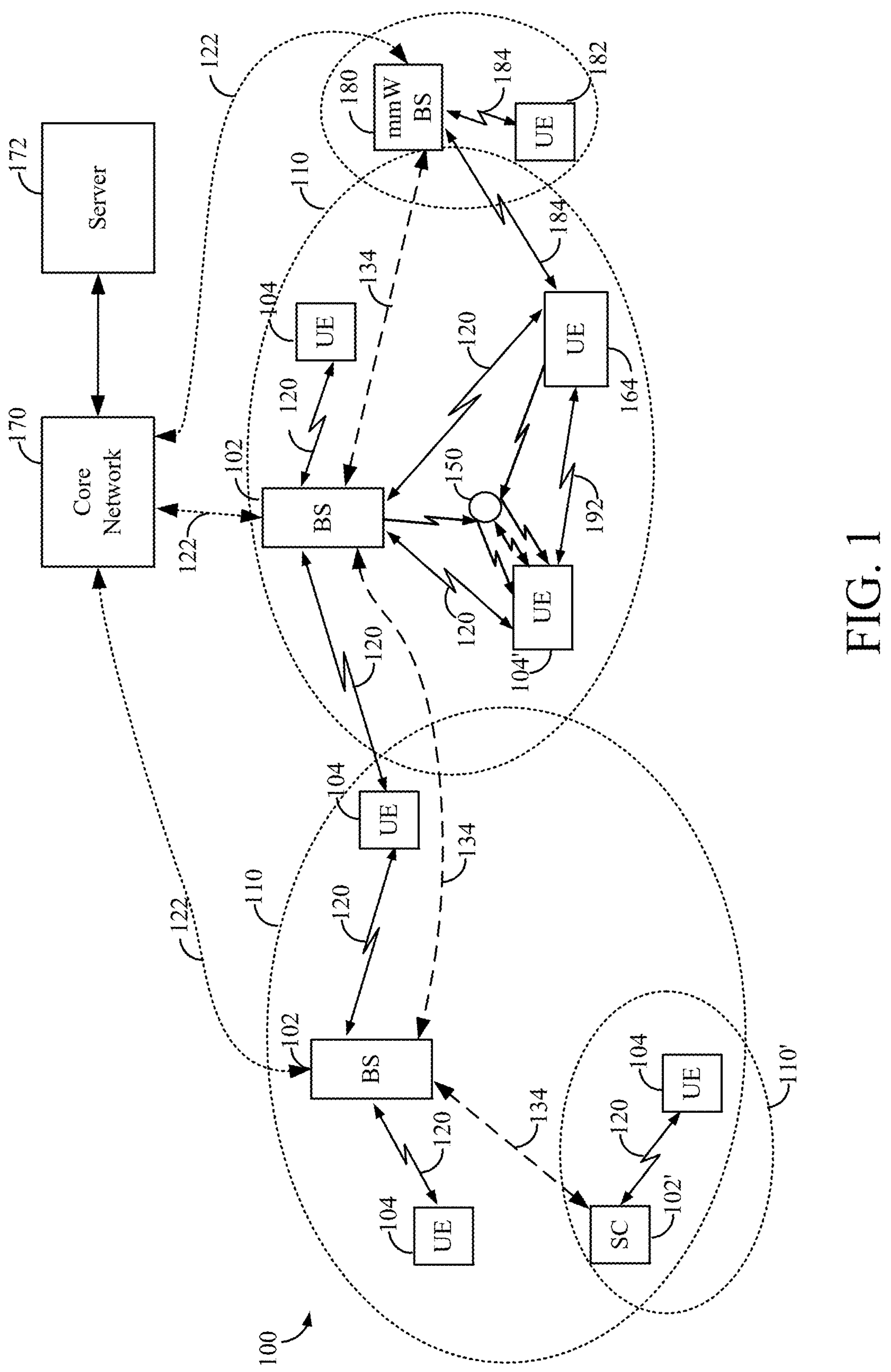
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on. UEs may be embodied by any of a number of types of devices including but not limited to printed circuit (PC) cards, compact flash devices, external or internal modems, wireless or wireline phones, smartphones, tablets, consumer asset tracking devices, asset tags, and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which a UE signals to another UE is called a sidelink (SL) or sidelink channel. As used herein, the term traffic channel (TCH) can refer to either an UL/reverse, DL/forward, or SL traffic channel.

The term "base station" may refer to a single physical transmission-reception point (TRP), which may also be referred to as a transmit/receive point, or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

Radio frequency (RF) sensing is a technique, similar to (and may include) radar, that can be used to determine one or more of the presence, location, identity, or combination thereof of objects in the environment. RF sensing, for example, may be used to image the environment, based on one or more of range, Doppler (which is a function of the velocity of an object), and angle information.

Integrated Sensing and Communication (ISAC) is an example of the use of RF signals to sense the environment. ISAC seeks to enable the combination of the sensing and communication systems to utilize resources efficiently and even to pursue mutual benefits, and is regarded as one of the key 5G+/6G features to be developed by many in the industry, including 3$^{rd}$ Generation Partnership Project (3GPP). ISAC, for example, is cost effective, as it shares RF (and possibly baseband) hardware for sensing and communication. Additionally, ISAC is spectrum effective as it provides an always-on availability of spectrum for both communication and sensing functions. Use cases for ISAC type technologies includes, e.g., macro sensing, such as meteorological monitoring, autonomous driving, dynamic mapping, low-altitude airspace (such as unmanned ariel vehicle (UAV)) management, and intruder detection. Another use case is micro sensing, such as gesture recognition, vital signal detection, high-resolution imaging with THz. Another example use case includes sensing assisted communication, e.g., beam management based on environmental sensing.

Legacy beam measurement, e.g., used for communication beams, is unsuitable for sensing operations. For example, in communication, the path that a communication signal experiences is not important. Accordingly, for beam selection in communication systems, the signal strength of a beam considers all paths experienced by the signal. In contrast, for sensing operations, the path that a sensing beam experiences is critical for sensing result validity.

Accordingly, as discussed herein, a sensing node, such as a UE or base station, supports beam selection for sensing based on a sensing-purpose beam measurement configuration, which may be received from a network node, such as a base station or sensing server. The sensing node measures received sensing-purpose beams and selects a sensing-purpose beam for sensing a target based on the sensing-purpose beam measurement configuration. Based on the sensing-purpose beam measurement configuration, for example, the sensing node may identify one or more paths (line of sight path (LOS) or non-LOS (NLOS) paths) for each of the received sensing-purpose beams, from which one or more target paths may be determined. The sensing node may then determine a measurement metric, such as reference signal received power (RSRP) or signal-to-interference-plus-noise ratio (SINR), for sensing-purpose beams using only the target paths. Additionally, an absolute delay or relative delay of the sensing-purpose beams along the target paths is determined. One or more sensing-purpose beams may be selected for sensing accordingly and reported to the network node, e.g. by identifying the selected sensing-purpose beams, and optionally providing the associated the measured metrics and delays. Accordingly, the beam selection for sensing is based on not only the received signal power, but also the experienced path of signal, which will improve performance of sensing systems.

Additionally, because a receiving sensing node is configured to report measurements for each configured transmitted sensing signals, a receiving sensing node may send reports even if there are no significant change in the environment, thereby consuming over-the-air (OTA) resources and consuming power. An example of unnecessary resource and power consumption may be roadside units (RSU) monitoring intersections in which there is no traffic.

Accordingly, as discussed herein, a sensing node may be configured to send sensing reports based on detected changes in the environment. For example, the sensing node may receive a valid reporting configuration. The sensing node may monitor channel state information (CSI) in received sensing-purpose beams and based on the valid reporting configuration may determine whether a valid reporting condition is present based on a change in the CSI of the measurements between of sensing-purpose beams. For example, the change may be estimated by computing a distance or dissimilarity measure between two CSIs. The change may be compared to a predetermined threshold to determine whether a valid reporting condition is present. The sensing node may send a sensing report once valid reporting conditions are determined to be present and may continue reporting until the expiration of a timer occurs and/or if the change in the distance or dissimilarity measure between two CSIs becomes less than a second predetermined threshold.

FIG. 1 illustrates an example wireless communications system 100. The wireless communications system 100 (which may also be referred to as a wireless wide area network (WWAN) or a wireless network (e.g., a cellular network) may include various base stations 102, sometimes referred to herein as gNBs 102 or other types of NBs, and various UEs 104. The base stations 102 may include macro cell base stations (high power wireless base stations) and/or small cell base stations (low power wireless base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more sensing servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by a WLAN AP. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "Pcell," and the remaining carrier frequencies are referred to as "secondary carriers" or "secondary serving cells" or "Scells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a Pcell or an Scell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "Pcell") and other frequencies utilized by the macro cell base stations 102 and/or the mmW base station 180 may be secondary carriers ("Scells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs that connects indirectly to one or more communication networks via one or more device-to-device (D2D) peer-to-peer (P2P) links. In the example of FIG. 1, UE 164 has a D2D P2P link 192 with one of the UEs 104 connected to one of the base stations 102. Link 192 may be used to indirectly obtain wireless connectivity or for D2D communications between UEs 104 and 164 without use of the base station 102. In some implementations, the link 192 is a sidelink (SL) between the UEs 104 and 164. In an example, the D2D P2P link 192 may be supported with any well-known D2D RAT, such as LTE Direct (LTE-D), WiFi Direct (WiFi-D), Bluetooth®, and so on.

The wireless communications system 100 may include a UE 164 that may communicate with a macro cell base station 102 over a communication link 120 and/or the mmW base station 180 over a mmW communication link 184. For example, the macro cell base station 102 may support a Pcell and one or more Scells for the UE 164 and the mmW base station 180 may support one or more Scells for the UE 164.

As illustrated in FIG. 1, the UE 104' may sense and an object 150 in the environment based on one or more RF sensing. The RF sensing, for example, may include mono-static sensing and multi-static sensing, such as bi-static sensing. In a mono-static sensing system, the UE 104' both transmits the RF signal and receives the RF signal that is reflected from the object 150. In a multi-static sensing system, the UE 104' may receive an RF signals reflected from the object 150 that is transmitted from another device, such as base station 102 or UE 164. An example of multi-static sensing is a bi-static system in which one transmitting device transmits and one receiving device receives, but any number of transmitting devices or receiving devices may exist. While UE 104' is illustrated in FIG. 1 as the receiving device, if desired a base station 102 may be the receiving device, in a mono-static sensing system or a multi-static sensing system, e.g., with a UE 104 (or UE 164) or another base station 102 transmitting the RF signals that are reflected from the object.

The wireless communications system 100 may include a sensing server 172, which may be external to the core network 170 or internal to the core network 170. The sensing server 172 may be used to configure the wireless network to support RF sensing. For example, in some implementations, the sensing server 172 may generate and send to a sensing node a sensing-purpose beam measurement configuration, to enable the sensing node to select one or more sensing-purpose beams for sensing a target object, as discussed herein. The sensing server 172 may receive a sensing-purpose beam measurement report from the sensing node that includes an identification of the selected sensing-purpose beams and optionally measurement metrics and delays of the selected sensing-purpose beams along their target paths. The sensing server 172 may be further configured to generate and send a valid CSI reporting configuration to enable the sensing node to send a sensing report only when changes are present in the environment.

During object sensing by wireless network, including mono-static sensing and bi-static/multi-static sensing, target objects may have irregular shapes, such as an unmanned ariel vehicle (UAV), by way of example. The irregular shape of the target object may cause the reflected signals to be unevenly distributed in all the directions. To increase the probability of receiving the reflected sensing signal, some UEs (legacy UE or sensing-dedicated UE) may be used for receiving the reflected signals, which is referred to as UE-assisted sensing. The UE may sometimes be called a "sensing UE" or "sensing node". The use of UEs as a sensing UE may be advantageous because the quantity of base stations in a cellular network is much smaller than the quantity of UEs. While various embodiments are described herein relating to UAV target objects, it should be understood that, unless stated otherwise, the present disclosure is not limited to UAV, and the target object for sensing may be other kinds of objects, such as planes, vehicles, ships, humans, animals, or any other desired object.

Figure 2A:
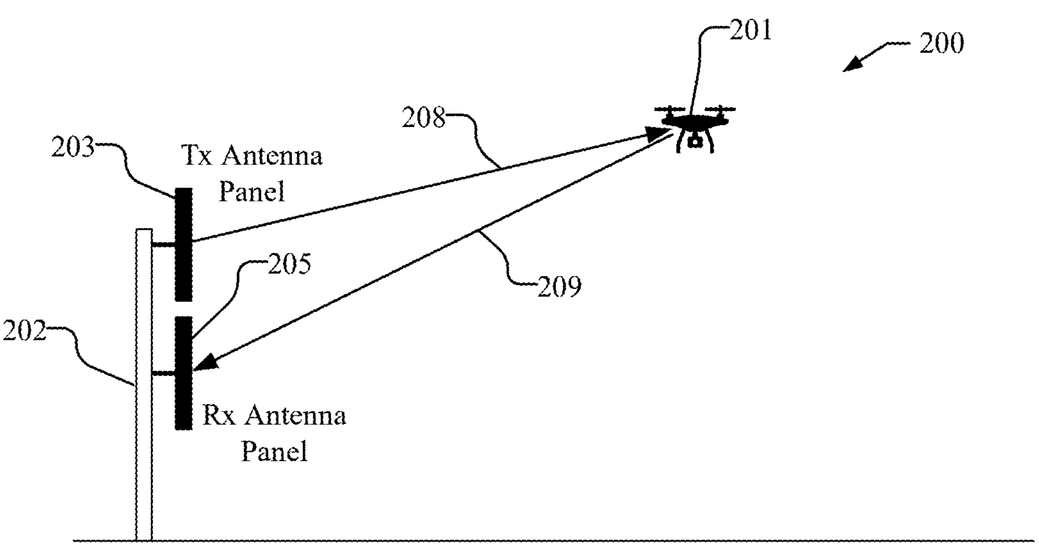
FIGS. 2A and 2B illustrate examples of a mono-static sensing system and a multi-static sensing system, respectively, used for sensing a target object.
Figure 2B:
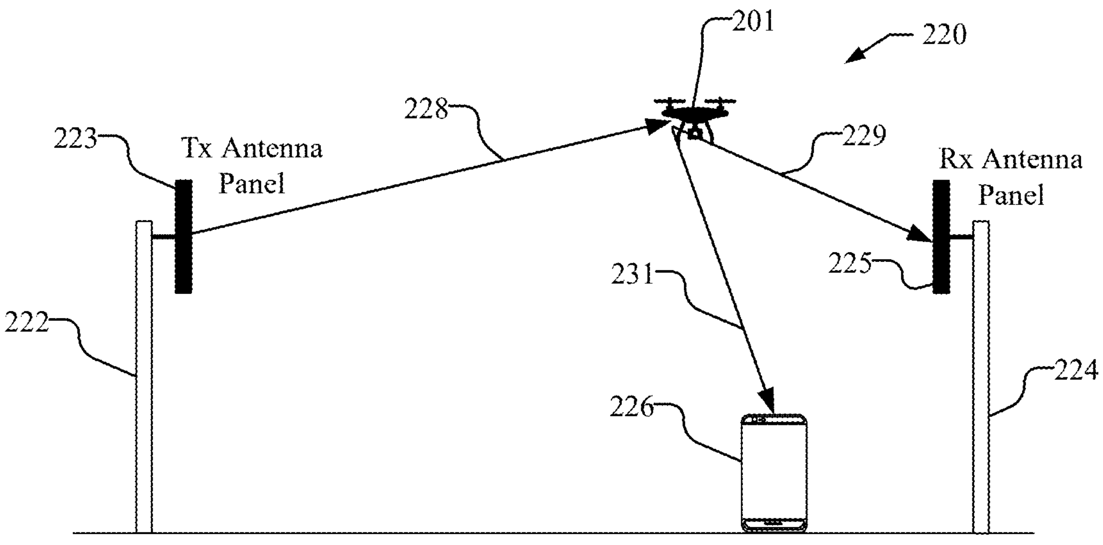

FIGS. 2A and 2B illustrate examples of a mono-static sensing system 200 and a multi-static sensing system 220, respectively, used for sensing a target object 201, illustrated as a UAV.

FIG. 2A illustrates mono-static sensing system 200 in which a base station 202, e.g., which may be a base station 102 in FIG. 1, both transmits and receives the sensing signal. In a mono-static sensing system, there is no need for transmit and receive pairing or grouping, but self-interference mitigation may be necessary.

As illustrated in FIG. 2A, base station 202 includes a transmit (Tx) antenna panel 203 and a receive (Rx) antenna panel 205. The Tx antenna panel 203 transmits a sensing signal 208 with a known angle of departure (AoD) (azimuthal angle and elevation angle), e.g., via beam forming. The sensing signal 208 is incident on the target object 201 and at least a portion of the sensing signal 208 is reflected as the reflected sensing signal 209 that is received by the Rx antenna panel 205. The Rx antenna panel 205 may measure the angle of arrival (AoA) (azimuthal angle and elevation angle), e.g., via beam forming, and may further measure the time of flight and phase information, with which angle, ranging, and Doppler information about the target object 201 may be determined.

FIG. 2B illustrates multi-static/bi-static sensing system 220 in which a Tx base station 222, e.g., which may be a base station 102 in FIG. 1, transmits a sensing signal, and one node (for a bi-static sensing system), such as one of a Rx base station 224 or sensing UE 226, or multiple other nodes (for a multi-static sensing system), such as both Rx base station 224 and sensing UE 226, receive the reflected sensing signal from the target object 201. In a bi-static/multi-static sensing system, there is no need for self-interference mitigation, but there is a need for transmit and receive pairing or grouping.

As illustrated in FIG. 2B, Tx base station 222 includes a Tx antenna panel 223 and the Rx base station 224 includes a Rx antenna panel 225. The sensing UE 226 may include an antenna array (not shown). It should be understood that the Tx base station 222 may also include a Rx antennal panel and the Rx base station 224 may include a Tx antenna panel, which are not used in present sensing operation. The Tx antenna panel 223 transmits a sensing signal 228 with a known AoD (azimuthal angle and elevation angle), e.g., via beam forming. The sensing signal 228 is incident on the target object 201 and is reflected as reflected sensing signals 229 and 231 that are received by the Rx antenna panel 225 and sensing UE 226, respectively. The Rx base station 224 and the sensing UE 226 may measure the AoA (azimuthal angle and elevation angle), e.g., via beam forming, and may further measure the time of flight and phase information, with which angle, ranging, and Doppler information about the target object 201 may be determined.

Figure 3:
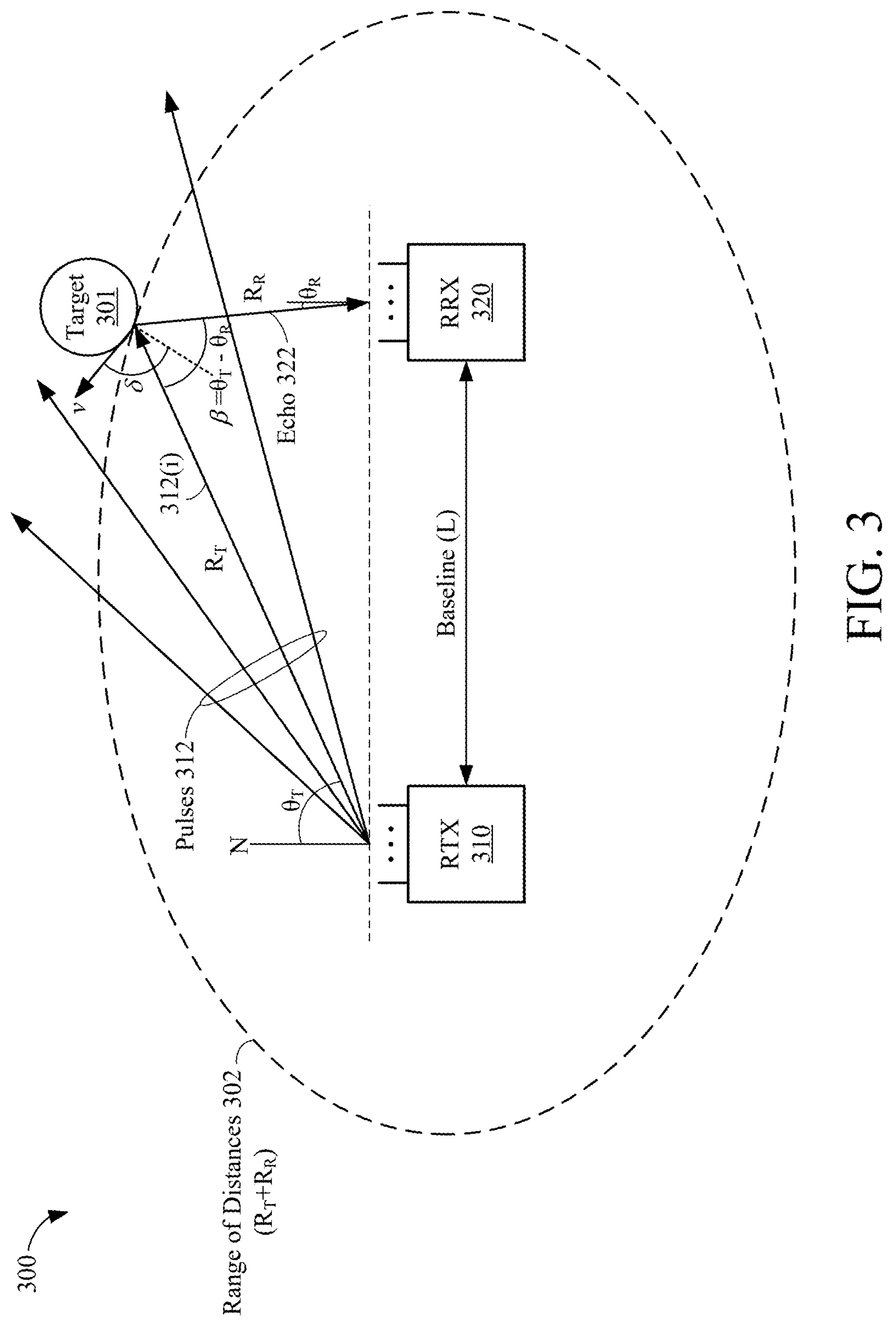
FIG. 3 shows an example of a bi-static sensing system.

FIG. 3 shows an example bi-static sensing system 300. The bi-static sensing system 300 includes an RF transmitter (RTX) 310 and an RF receiver (RRX) 320. The RF transmitter 310 and the RF receiver 320 are spatially separated by a baseline (L). In some implementations, the RF transmitter 310 may be one example of a base station 102 (or UE 104) and the RF receiver 320 may be an example of one of a different base station 102 (or UE 104) of FIG. 1.

The RF transmitter 310 is configured to transmit RF pulses 312 in a number of directions. Each of the pulses 312 may be a beamformed RF signal having a particular width and directionality. Objects or surfaces along the trajectory of any of the pulses 312 may cause the pulses 312 to reflect or scatter. Reflected pulses may be referred to as "echoes" of the pulses from which they originate. In the example of FIG. 3, a target object 301 is located along the path of one of the RF pulses 312. The RF pulse 312(*i*) incident on the target object 301 is reflected as an echo 322. As shown in FIG. 3, the echo 322 is reflected in the direction of the RF receiver 320. The RF receiver 320 may determine ranging, Doppler, or angle information about the target object 301 based on the reception of the echo 322. For example, ranging information with respect to the target object 301 may be determined, including, but not limited to, a distance, direction, or velocity of the target object 301.

In some implementations, the RF receiver 320 may determine a distance ($R_R$) of the target object 301 relative to the RF receiver 320 based, at least in part, on the baseline distance L (between the RF transmitter 310 and the RF receiver 320), an angle of arrival ($\theta_R$) of the echo 322, and a time of flight ($\tau$) from the transmission of the incident pulse 312(*i*) by the RF transmitter 310 to the reception of the resulting echo 322 by the RF receiver 320. More specifically, the distance $R_R$ can be calculated according to Equation 1.

$$R_R = \frac{(R_T + R_R)^2 - L^2}{2(R_T + R_R - L\cos\theta_R)} \tag{1}$$

where $R_T$+$R_R$ represents the combined distances from the target object 301 to each of the RF transmitter 310 and the RF receiver 320. As shown in FIG. 3, $R_T$+$R_R$ defines a range of distances 302 around the RF transmitter 310 and the RF receiver 320 (in the shape of an ellipse) in which the target object 301 may be located. More specifically, $R_T$+$R_R$ can be calculated, according to Equation 3, as a function of the baseline (L), the time of flight of the reflected pulse ($\tau$), and the propagation speed of the RF pulses ($c_p$).

$$R_T + R_R = c_p\tau + L \tag{2}$$

With reference to Equations 1 and 3, the baseline L and propagation speed $c_p$ represent fixed or preconfigured values inherent to the sensing system 300. The angle of arrival OR may be determined based on a time difference of arrival (TDOA) of the echo 322 between different receive antennas of the RF receiver 320 in an antenna array or based on the antenna sector (corresponding to a preset beam of a phased array antenna) used by the RF receiver 320 to receive the echo 322. However, to calculate the time of flight $\tau$, the RF receiver 320 must have knowledge of the time at which the incident pulse 312(*i*) was transmitted at the position of the receiver. More specifically, the time of flight t can be calculated, according to Equation 3, as a function of the time of transmission of the incident pulse ($T_{pulse}$) and the time of reception of the echo ($T_{echo}$).

$$\tau = T_{echo} - T_{pulse} \tag{3}$$

For a stationary RF transmitter 310 and stationary RF receiver 320, the target bi-static Doppler frequency is given by:

$$f_D = \frac{2v}{c_p} * \cos\delta * \cos\left(\frac{\beta}{2}\right) \tag{2}$$

where v is the velocity of the target object 301, $\beta$ is the difference between the angle of departure $\theta_T$ and the angle of arrival $\theta_R$, and $\delta$ is the angle between the velocity vector v and the angle $\beta$.

Because the RF transmitter 310 and the RF receiver 320 are implemented in (or correspond to) separate wireless communication devices, the RF transmitter 310 may need to communicate the timing of the transmission of the incident pulse $T_{pulse}$ to the RF receiver 320. However, because the RF transmitter 310 transmits pulses 312 in a number of directions, the RF transmitter 310 may be unaware as to which of the pulses 312 is incident on the target object 301. Accordingly, the RF transmitter 310 may need to communicate the timing of each of the pulses 312 to the RF receiver 320, and the RF receiver 320 may need to determine which of the pulses 312 resulted in the echo 322.

In some implementations, the RF transmitter 310 also may determine ranging information regarding the target object 301. For example, the RF transmitter 310 may determine its relative distance $R_T$ to the target object 301. For example, in some aspects, the RF receiver 320 may provide feedback regarding the echo 322 to the RF transmitter 310. The feedback may include the timing of the echo $T_{echo}$, the timing of the transmitted pulse $T_{pulse}$, the time of flight $\tau$, the angle of arrival $\theta_R$, the calculated distance $R_R$, or any combination thereof. The RF transmitter 310 may then calculate the distance $R_T$ of the target object 301 based, at least in part, on the angle of departure $\theta_T$ of the incident pulse 312(*i*). For example, the RF transmitter 310 may calculate the distance $R_T$ by substituting the angle of departure Or for the angle of arrival $\theta_R$ in Equation 1. The RF transmitter 310 may determine the angle of departure Or based on the antenna sector (corresponding to a particular beam of a phased array antenna) used by the RF transmitter 310 to transmit the incident pulse 312(*i*).

A mono-static sensing system operates similarly to the bi-static sensing system 300, but the RF transmitter 310 and RF receiver 320 are the same entity, thereby eliminating a need for Tx/Rx pairing grouping, but increasing the need for self-interference mitigation.

Wireless communications systems capable of sensing, e.g., ISAC, such as wireless communications system 100 shown in FIG. 1, have many use cases, including macro sensing, micro sensing, and beam management. For example, macro sensing may be used for meteorological monitoring, autonomous driving, dynamic mapping, low-altitude airspace (e.g., UAV) management, and intruder detection. Micro sensing may be used for gesture recognition, vital signal detection, high-resolution imaging with THz. Beam management, by way of example, may use environmental sensing for sensing assisted communication.

Figure 4:
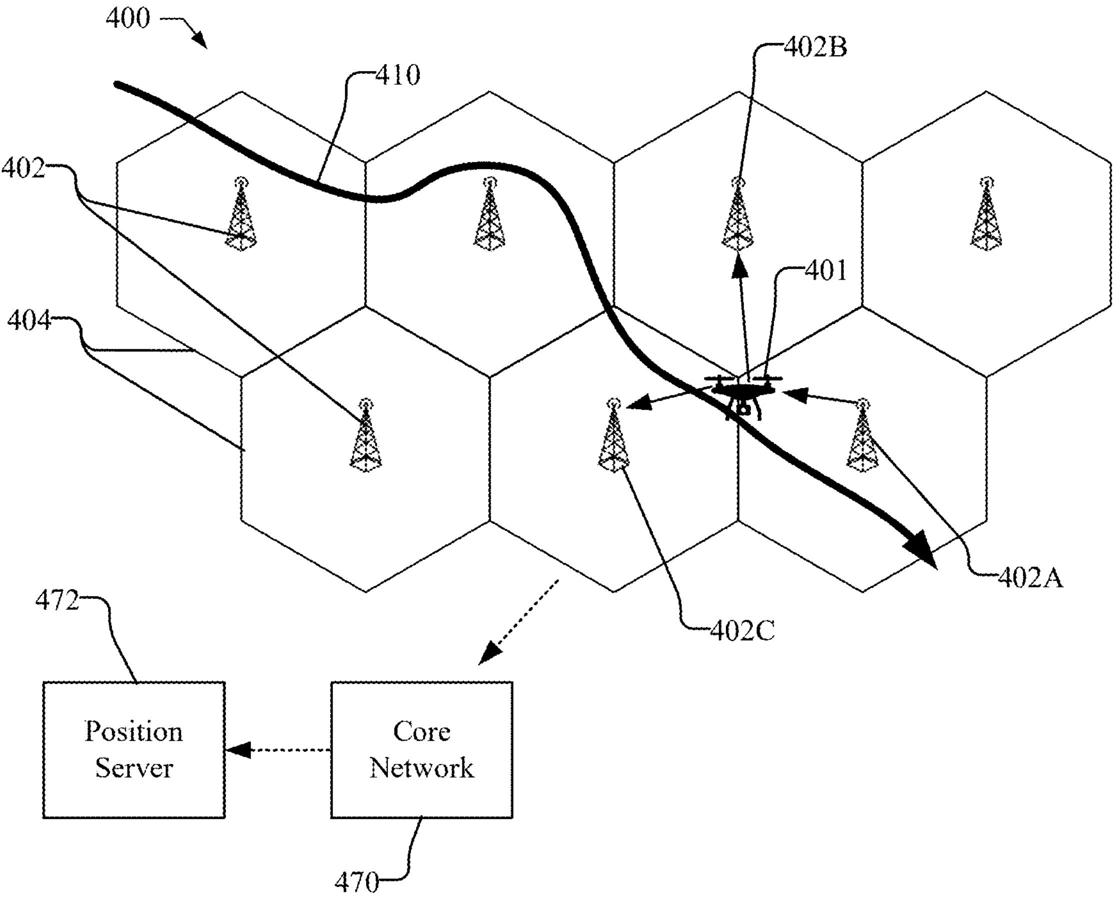
FIG. 4 illustrates a wireless communication system that may be used for a macro sensing for a use case of low-altitude airspace management.

FIG. 4, by way of example, illustrates a wireless communication system 400 that may be used for a macro sensing use case of low-altitude airspace management. The wireless communication system 400 includes a number of base stations 402 and associated cells 404, that interface with a core network 470 and one or more sensing/positioning servers 472, which may be the same as core network and sensing server 172 shown in FIG. 1. FIG. 4 illustrates a moving target object 401 (UAV) traveling through cells 404 along a path 410. As illustrated, the target object 401 may be monitored using multi-static sensing, shown by the base station 402*a* transmitting a sensing signal and base stations 402*b* and 402*c* receiving the reflected sensing signal (echo). It should be understood that mono-static by multiple base stations 402 may be used as well. Moreover, the reflected sensing signal (echo) may be received by other receiving entities, such as one or more sensing UEs (not shown in FIG. 4).

The use of a wireless communication system 400 for sensing target objects, such as target object 401, may be beneficial as existing physical sites may be used, thereby lowering deployment costs, and the shared RF/baseband hardware in the sensing nodes (e.g., base stations and/or sensing UEs) reduces hardware costs. Moreover, the use of a wireless communication system 400, which is deployed over a large area, may be advantageous in applications such as low-altitude airspace management, as illustrated in FIG. 4. Further, the networking in 5G and future 6G systems may be used advantageously for cooperative sensing and target tracking.

In current NR system, a gNB can configure a UE to measure physical layer metrics and then report the measurements, including Layer 1 (Physical Layer) (L1)-RSRP, L1-SINR, etc. For example, a gNB may transmit a set of beams in a Channel State Information (CSI) Reference Signal (RS) (CSI-RS) resource set. The UE may select the beam with the largest RSRP or SINR, and then report the value of the RSRP or SINR and the associated CRI. The gNB may determine the optimal communication beam based on the report received from the UE. The beams transmitted by the gNB in this process, however, are communication beams.

The communication beam measurement process cannot be used directly for sensing operations without some enhancement to enable the determination of the optimal beam for sensing. For example, for communication, the transmitter and receiver entities do not care about the paths that the communication signal experiences. In other words, line of sight (LOS) or non-LOS communication signals may both be used for communication.

Figure 5:
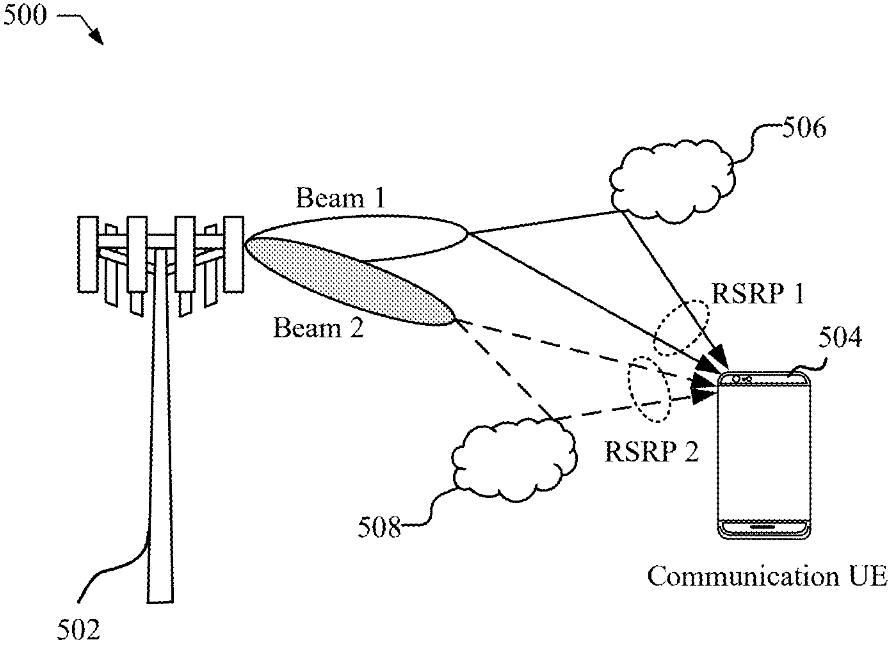
FIG. 5 illustrates a wireless communication system with a communication user equipment (UE) selecting the optimal beam to be used for communications.

FIG. 5, by way of example, illustrates a communication system 500, in which a base station 502 is transmitting signals in a number of beams (beam 1 and beam 2). The beams may be, e.g., a CRI-RS resource set. The communication UE 504 receives both LOS signals and non-LOS (NLOS) signals (e.g., reflecting from objects 506 and 508) for beam 1 and beam 2. When the communication UE 504 selects the optimal beam to be used for communication, it considers all the experienced paths (LOS and NLOS) for each beam. The RSRP for each beam involves the received powers from all the experienced paths. Thus, as illustrated, the communication UE 504 measures the total strength, e.g., RSRP 1, for beam 1 using both the LOS and NLOS signals. Similarly, the communication UE 504 measures the total strength, e.g., RSRP 2, for beam 2 using both the LOS and NLOS signals.

On the other hand, for sensing, the path that the signal experiences is a critical condition for the sensing result validity. For example, for sensing, the non-LOS signal reflected from the target object should be used, but including LOS signals and/or NLOS signals that are not from the target object in the measurements may produce invalid results. Therefore, the beam selection for sensing should be based on not only the received signal power, but also the experienced path of the signal.

Figure 6:
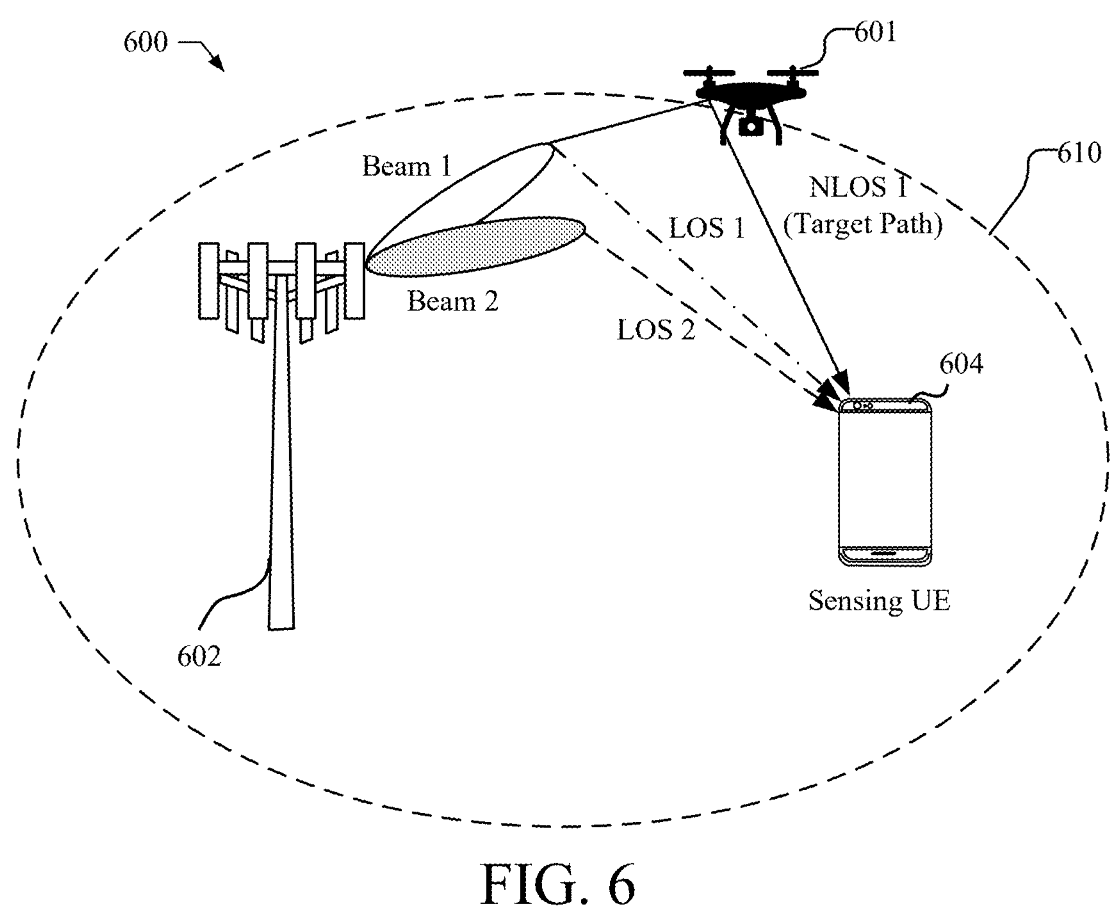
FIG. 6 illustrates a wireless communication system with a sensing UE acting as a sensing node and selecting the optimal beam to be used for sensing a target object.

FIG. 6, by way of example, illustrates a sensing system 600 in which a network node 602, e.g., a gNB, is transmitting a number of sensing signal resources (beam 1 and beam 2). Beam 1 is incident on and reflected by the target object 601 producing a NLOS 1 signal along the target path to the sensing node 604. As illustrated, the sensing node 604 also receives the LOS signals from beam 1 (LOS 1) and beam 2 (LOS 2). The sensing node 604 is illustrated in FIG. 6 as a sensing UE, but in some implementation, may be another base station, e.g., gNB. Moreover, the network node 602 is illustrated as a transmitting sensing entity, e.g., a base station, but the network node 602 may be another UE. Moreover, the network node 602 may be or may include a sensing server (e.g., sensing server 172 shown in FIG. 1).

The signal strength measured by sensing node 604 for beam 2 (based on LOS 2) may be greater than the signal strength measured for beam 1 along the target path (NLOS 1). Moreover, the total signal strength if measured for beam 1 using both LOS 1 and NLOS 1 would be an inaccurate measurement for sensing the target object 601.

Accordingly, in one implementation, a network node 602, such as a base station 102 or sensing server 172, transmits a sensing-purpose beam measurement configuration to a sensing node (e.g., sensing node 604) that is used for measuring sensing-purpose beams and selecting one or more sensing-purpose beams for sensing the target object 601. The sensing node 604 may then send a measurement report to the network node 602 (or to a different network node) identifying each of the one or more selected sensing-purpose beams, which are used for sensing the target object, e.g., using the selected one or more sensing-purpose beams.

Figure 7:
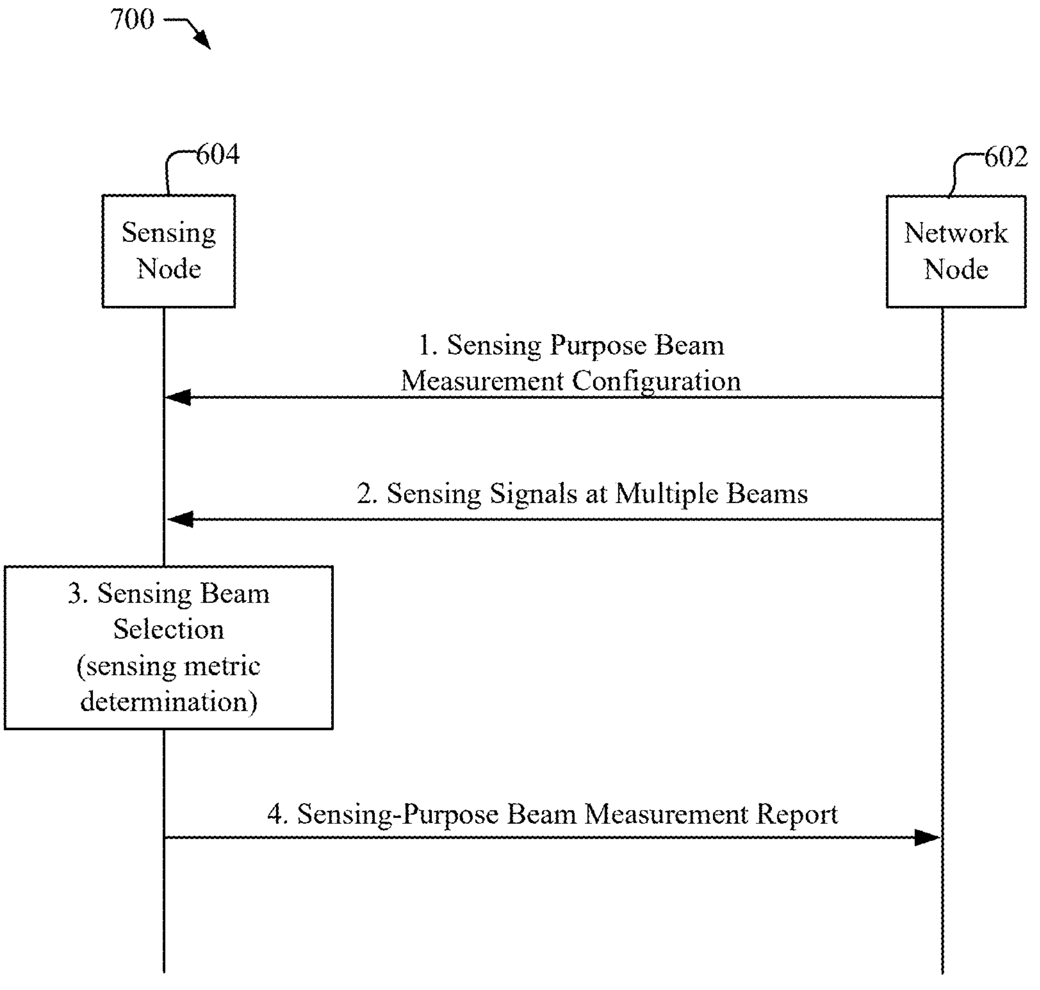
FIG. 7 illustrates is a message flow between a network node and sensing node to support sensing beam selection using a sensing-purpose beam measurement configuration.

FIG. 7 illustrates a message flow 700 between the network node 602 and the sensing node 604 illustrated in FIG. 6, to support sensing beam selection using a sensing-purpose beam measurement configuration. The network node 602 may be a base station, such as a base station 102 shown in FIG. 1, or may be a sensing server, such as sensing server 172 shown in FIG. 1. The sensing node 604, for example, may be a UE, such as UE 104 shown in FIG. 1 or a base station, such as base station 102 shown in FIG. 1. While not illustrated in FIG. 7, the message flow 700 may include additional nodes. For example, if the network node 602 is a sensing server, an additional network node in the form of a base station may be present to communicate with the sensing node 604 and to transmit sensing-purpose beams. The procedure illustrated in FIG. 7 may be used in support of RF sensing, such as mono-static or bi-static radar sensing of the target object 601, e.g., as discussed in reference to FIG. 6. It should be understood that FIG. 7 illustrates messages that may be transmitted in support of RF sensing but may not include all messages or actions performed during the RF sensing, and additionally include messages or actions that are provided for the sake of completeness, but may not be necessary for RF sensing.

At stage 1, the network node 602 provides sensing-purpose beam measurement configuration to the sensing node 604. The sensing-purpose beam measurement configuration may contain one or more parameters, which may be used to assist in receiving and measuring the sensing-purpose beams, selection of the sensing-purpose beams, and reporting the selected sensing-purpose beams.

The sensing-purpose beam measurement configuration may contain one or more parameters, which may be used to assist in receiving and measuring the sensing-purpose beams, selection of the sensing-purpose beams, and reporting the selected sensing-purpose beams. For example, the sensing-purpose beam measurement configuration provided by the network node 602 may contain the associated resources of the sensing signals, e.g., a sensing signal resource set, where each sensing signal resource corresponds to a sensing beam. The sensing-purpose beam measurement configuration may contain measurement metrics for measuring the sensing signals, such as sensing-RSRP (or NLOS-RSRP), sensing-SINR (or NLOS-SINR). The sensing-purpose beam measurement configuration may contain criterion for target path determination, such as a largest-power NLOS path or Doppler frequency signature (i.e., Doppler signature). For example, the Doppler frequency signature may include a micro-Doppler profile. The sensing-purpose beam measurement configuration may (optional) contain a minimum absolute delay and/or a minimum relative delay compared with LOS path. The sensing-purpose beam measurement configuration may contain a quantity of the target paths to be included in the sensing-purpose beam measurement report. The sensing-purpose beam measurement configuration may contain a report format for each selected sensing purpose beam, such as sensing signal resource identifier (ID), at least one of a sensing-RSRP sensing-SINR, an absolute delay with respect to the transmission time of the sensing purpose beam, a relative delay with respect to the LOS path, information about errors (e.g., uncertain level) of the results, or any combination thereof.

The sensing node 604 may perform sensing-purpose beam measurement and reporting based on the received sensing-purpose beam measurement configuration.

At stage 2, the network node 602 transmits sensing signals using multiple resources (beams) that may be received by the sensing node 604. For example, for each indicated sensing signal resource in the sensing-purpose beam measurement configuration (e.g. beam 1 and beam 2 in FIG. 6) received at stage 1 of FIG. 7, the sensing node 604 may receive the sensing signal at stage 2 of FIG. 7. One or more of the sensing signals may be received along different beam paths. Beams, for example, may be received directly by the sensing node 604, e.g. along a line of sight (LOS) path, and beams may be reflected by the target object 601 (and other objects) and sensing node 604 may receive the reflected beams along a non-line of sight (NLOS) paths.

At stage 3, the sensing node 604 selects one or more sensing-purpose beams for sensing the target object based on at least the sensing-purpose beam measurement configuration. The selection of the sensing-purpose beams for sensing the target object may include measuring one or more metrics of the sensing-purpose beams, such as signal strength information.

At stage 4, the sensing node 604 sends a sensing-purpose beam measurement report to the network node 602 that includes at least an identification of each of the one or more selected sensing-purpose beams. The report may include additional information, such as the metrics, e.g. Signal strength measurements, as well as delays or other information related to receiving the selected sensing-purpose beams.

For example, in one possible example, in stage 2, the sensing node 604 may detect both the LOS signal and the NLOS signal (e.g., LOS 1 and NLOS 1, along the target path) from the same beam (beam 1) and the NLOS signal has a matching Doppler frequency signature, e.g., which may include a micro-Doppler profile, e.g., determined in stage 3. The NLOS 1 signal should be the optimal beam for sensing. The sensing node 604 may provide a report in stage 4 to the network node 602 (or other network node) that includes information about both the LOS signal and the NLOS signal and indicates the relative delay between them.

In another possible example, in stage 2, the sensing node 604 may detect only a NLOS signal (e.g., NLOS 1), which may have a matching Doppler frequency signature, e.g., which may include a micro-Doppler profile, as the sensing beam (beam 1) (as provided in the sensing-purpose beam measurement configuration), but the sensing node 604 does not receive the LOS signal (e.g., LOS 1) for the beam, e.g., determined in stage 3. In one scenario, the sensing node 604 may detect a LOS signal (e.g. LOS 2) from another beam (e.g., beam 2). The identity of both beams, i.e., the beam 1 and beam 2, and their relative delay may be reported in stage 4 by the sensing node 604 to the network node 602 (or other network node). In another scenario, in stage 3, the sensing node 604 may calculate the relative delay of the NLOS signal against a known reference beam. The identity of both the NLOS signal and the reference beam, and the relative delay of the NLOS signal with respect to the reference beam may be reported in stage 4 by the sensing node 604 to the network node 602 (or other network node).

In some implementations, for determination of whether a received signal is a LOS signal or NLOS signal, a polarization-based method may be used. For example, the network node 602 may transmit signals in stage 2 with certain polarization characteristics (e.g., circular polarization) which are only preserved in a LOS path. The polarization characteristic may be provided to the sensing node 604 in the sensing-purpose beam measurement configuration in stage 1. If the sensing node 604 receives only one signal for a beam, in stage 3 the sensing node 604 may determine if the signal is a LOS signal or NLOS signal based on the whether a change in polarization state in the signal has occurred.

The reporting by the sensing node 604 in stage 4 may be a measurement report or a sensing result. For example, as discussed previously, the sensing node 604 may make the delay measurements and report the delay results. The network node 602 (or other network node) may then determine the sensing result based on the report. Alternatively, the sensing node 604 may also make the sensing calculation, if given sufficient information, which is referred to as receiver-based sensing. For a receiver-based sensing calculation, the sensing node 604 may receive necessary information from the network node 602 (or other network node) for the sensing calculation. For example, the sensing node 604 may receive the transmission timing information for the multiple beams so that the relative delay between any two beams can be derived by the sensing node. The sensing node 604 may calculate the timing of the NLOS path with Doppler frequency signature match, and its associated beam, and identify a reference beam (either the same beam or a different beam), calculate the relative delay between the NLOS path and the LOS path from the reference beam and subtract the timing difference between the sensing beam and reference beam if they are different.

In stage 3, the sensing node 604 may determine the target path based on the sensing-purpose beam measurement configuration as well as other information. For example, the sensing node 604 may be normally static, e.g., if the sensing node 604 is a base station. Even if the sensing node 604 is a sensing UE, the UE used for sensing may be static or moving relatively slowly. Accordingly, during sensing deployment, the delays of background signals (i.e., without a target objects in the target area) between the network node 602 and the sensing node 604 may be measured in advance. These background signals contain LOS paths (with the smallest delay). The sensing node 604 may use the background signal measurement to determine likely target paths, as the signals with delays larger than the LOS signals are possibly associated with target paths.

If the network node 602 (or other network node) configures and provides assistance information to the sensing node 604, the sensing node 604 may further reduce the list of candidate target paths. For example, the network node 602 (or other network node) may determine a minimum delay of the target path (a reflection path) based on a known distance from the target object 601. For example, the network node 602 (or other network node) may know the height of the target object 601, e.g., if the target object is a UAV, so the minimum delay of the target path (a reflection path) can be calculated based on the height of the target object 601 and provided to sensing node 604. For target path determination, the sensing node 604 may only considers the paths whose delays are larger than the minimum delay.

In another example, the network node 602 (or other network node) may know the blade rotation speed of the target object 601, e.g., if the target object is a UAV. Accordingly, the scope of Doppler frequency spread (sometimes referred to as micro Doppler profile) of the target object 601 (UAV) can be calculated and indicated to sensing node 604, e.g., in stage 1. The micro Doppler refers to the Doppler frequency caused by moving components on the target object 601, such as the rotation of a UAV's blades. For target path determination in stage 3, the sensing node 604 may only consider the paths with Doppler frequency signature, which may include a micro Doppler profile, that match the Doppler frequency signature provided in stage 1.

Based on the configured quantity of the target paths to include in the sensing-purpose beam measurement report provided in stage 1, the sensing node 604 may select the quantity of paths with the largest sensing signal strength (e.g., RSRP or SINR) out of the candidate set.

In stage 3, the sensing node 604 may determine the measuring metric, e.g., sensing RSRP and/or SINR, and the absolute or relative delays for each possible target path.

Figure 8:
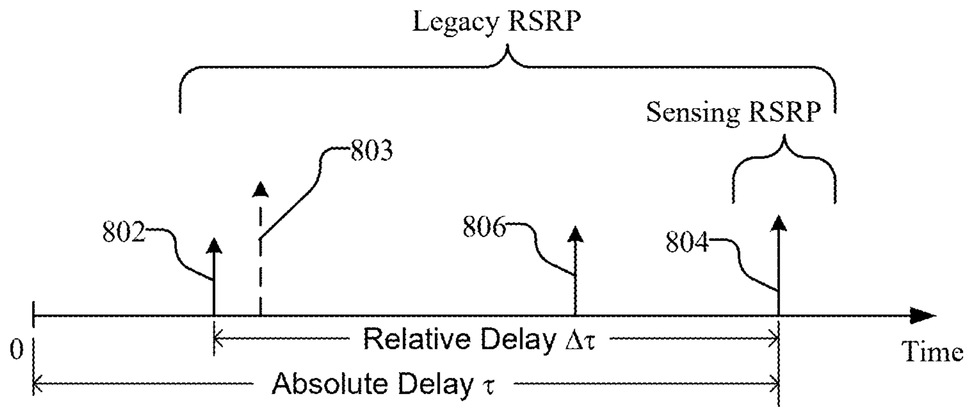
FIG. 8 illustrates the determination of measurement metrics and delays of sensing-purpose beams along possible target paths.

FIG. 8, by way of example, illustrates the determination of measurement metrics and delays of sensing-purpose beams along possible target paths. FIG. 8 shows an example of signals (illustrated as vertical arrows) received by the sensing node 604 over time T, from which the measuring metric, e.g., sensing RSRP and sensing-SINR, and the absolute or relative delay can be determined. The length of the vertical arrows in FIG. 8 illustrates the signal strength of the received signals. Receipt of beam 1 (shown in FIG. 6) is illustrated by signals 802, 804, and 806, where signal 802 corresponds to the LOS path, signal 804 corresponds to the NLOS along the target path, and signal 806 corresponds to another NLOS path caused by reflection from another object, such as a bird. Receipt of beam 2 (shown in FIG. 6) is illustrated by signal 803, which corresponds to a LOS path. It should be understood that there may be more beams and NLOS signals per beam received by the sensing node 604.

The LOS paths received as signals 802 and 803 may be identified by the sensing node 602 as fixed background signals, e.g., measuring in network deployment when the target object is not present. The target path may be identified by the sensing node 604 from the NLOS paths received as signals 804 and 806, e.g., based on the micro-Doppler profile or a minimum delay of the target path (a reflection path) that is based on the height of the target object 601. For example, the micro-Doppler profile of a UAV target object 601 will differ significantly from that of a bird, and thus, the signal 806 from the bird may be eliminated from the candidate set and target path may be identified as signal 804. Further, if a minimum delay of the target path based on the height of the target object 601 is provided to the sensing node 604, the signal 806 from the bird may be eliminated from the candidate set and the target path may be identified as signal 804.

Once the target path is identified, the sensing node 604 may determine a measuring metric, such as the signal strength, for the signal associated with the target path in stage 3. For example, the sensing RSRP may be measured using only the path with the target object's characteristics, e.g., micro-doppler profile, or minimum delay value. In comparison, the conventional (legacy) RSRP for a communication beam would measure the RSRP for all paths of the beam, e.g., including signal 802 and 804 in FIG. 8.

The sensing RSRP may be determined based on the received power of the target object's reflection path and the number of sensing signal resource elements (REs) as follows.

$$sensingRSRP(\text{dB}) = \text{Received power of } targetPath\,(\text{dB}) - 10 * \log 10\,(\text{no. of sensing signal } REs) \quad \text{Eq. 1}$$

Other metrics may be measured, such as sensing SINR, if desired. The sensing-SINR (dB) may be determined as follows.

$$sensingSINR(\text{dB}) = sensingRSRP(\text{dB}) - \text{interference} - \text{plus} - \text{noise}(\text{dB}) \quad \text{Eq. 2}$$

In the sensing-purpose beam measurement report sent by the sensing node 604 to the network node 602 (or other network node) in stage 4, the sensing node 604 may report the beam ID associated with the measured metric value, e.g., the largest sensing RSRP, and the network node 602 (or other network node) may determine the optimal sensing beam or perform beam refinement (transmit narrower beams within the scope of the reported beam).

Additionally, the sensing node 604 may measure the delay of the signal associated with the target path. For example, the absolute delay τ may be measured based on the time of transmission of the beam (e.g., illustrated as time 0 in FIG. 8) to the time of receipt of the signal 804 associated with the target path. The relative delay Δτ may be measured based on the time of receipt of the signal 802 associated with the LOS path and the time of receipt of the signal 804 associated with the target path. The reflection path distance D may be determined based on the propagation speed of the signal, e.g., speed of light c, and either the relative delay Δτ value or the absolute delay τ as follows.

$$D = \Delta\tau \times c + LOS \text{ path distance} \quad \text{Eq. 3}$$

$$D = \tau \times c \quad \text{Eq. 4}$$

In the sensing-purpose beam measurement report sent by the sensing node 604 to the network node 602 (or other network node) in stage 4, in addition to the beam ID and measured metric value, the sensing node 604 may report the delay, e.g., the absolute delay or relative delay of the signal 804 associated with the target path. Based on the delay values, the network node 602 (or other network node) may calculate the reflection path distance, based on which the ellipse surface of possible target object 601 (UAV) positions can be generated. FIG. 6, by way of example, illustrates an ellipse 610 surface with the transmitting entity, i.e., network node 602, and the receiving entity, i.e., sensing node 604 as focus points, where the sum distance between any point on the ellipse 610 and the two focus points is equal to the calculated reflection path distance. By generating multiple ellipse surfaces, e.g., using a multi-static sensing system and/or a plurality of bi-static sensing systems, the position of the target object 601 may be determined.

The selection of the sensing beam by the sensing node 604 in stage 3 may be based on the larger measured metric, e.g., the sensing RSRP or sensing SINR, based on only the signal associated with the target path.

Figure 9A:
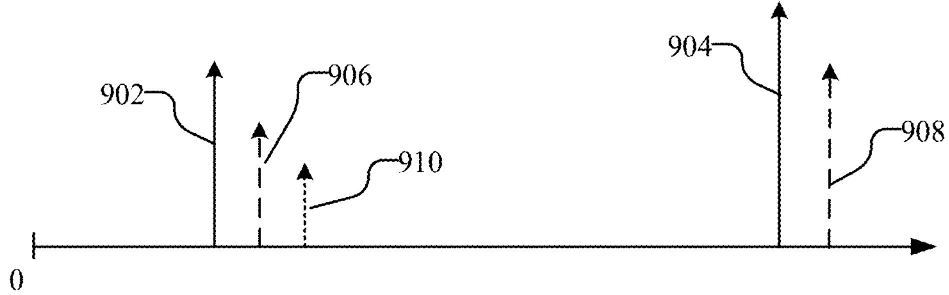
FIGS. 9A and 9B illustrate examples of variations in signal strengths of sensing-purpose beams along various possible paths.

FIG. 9A illustrates an example of signals (illustrated as vertical arrows) received by the sensing node 604 over time T. FIG. 9A illustrates the receipt of beam 1 as signal 902 (along a LOS path) and signal 904 (along a NLOS path corresponding to the target path). Similarly, beam 2 is received as signal 906 (along a LOS path) and signal 908 (along a NLOS path corresponding to the target path). A third beam, beam 3, is illustrated as being received as signal 910 along a LOS path. The sensing RSRP for beam 1 is based on the sensing RSRP for only signal 904, whereas the legacy RSRP for communication would include all beam paths, including signals 902 and 904. Similarly, the sensing RSRP for beam 2 is based on the sensing RSRP for only signal 908, whereas the legacy RSRP for communication would include all beam paths, including signals 906 and 908. Thus, FIG. 9A illustrates a relatively large sensing RSRP and a relatively small legacy RSRP. In this instance, beam 1 may be selected as the sensing beam due to the larger sensing RSRP for signal 904.

Figure 9B:
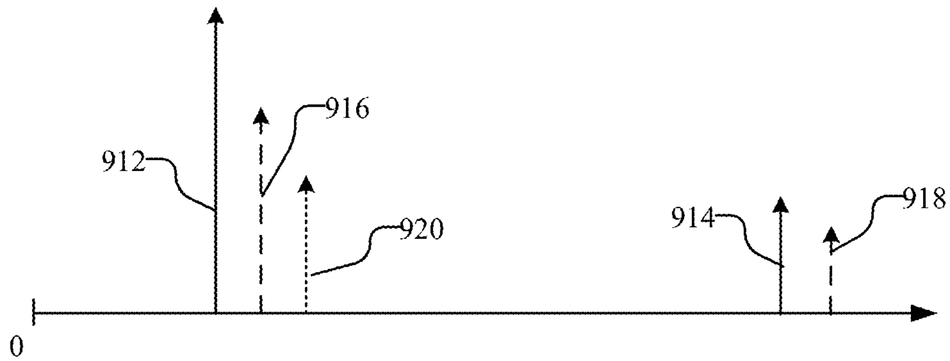

FIG. 9B, is similar to FIG. 9B, and illustrates another example of signals (illustrated as vertical arrows) received by the sensing node 604 over time T. FIG. 9B illustrates the receipt of beam 1 as signal 912 (along a LOS path) and signal 914 (along a NLOS path corresponding to the target path). Similarly, beam 2 is received as signal 916 (along a LOS path) and signal 918 (along a NLOS path corresponding to the target path). A third beam, beam 3, is illustrated as being received as signal 920 along a LOS path. The sensing RSRP for beam 1 is based on the sensing RSRP for only signal 914, whereas the legacy RSRP for communication would include all beam paths, including signals 912 and 914. Similarly, the sensing RSRP for beam 2 is based on the sensing RSRP for only signal 918, whereas the legacy RSRP for communication would include all beam paths, including signals 916 and 918. Thus, FIG. 9B illustrates a relatively small sensing RSRP and a relatively large legacy RSRP. In this instance, beam 1 may be selected as the sensing beam due to the larger sensing RSRP for signal 914.

The sensing node 604 reports measurements for each configured transmitted sensing signal. In some instances, however, there may be no significant change in the environment and, thus, the sensing node 604 may not need to send a sensing measurement result to the network node 602. By preventing the reporting of sensing measurement results when there are no changes, the over-the-air (OTA) sensing resource utilization is reduced and power consumption is improved. By way of example, with sensing nodes such as a roadside units (RSUs) monitoring intersections, it may be desirable to only report measurements based on detected changes in the environment.

Accordingly, in some implementations, the sensing node 604 may be configured by the network node to report only channel state information (CSI) changes for sensing purposes. The CSI, for example, may be estimated using signals such as configured sensing reference signals, which may be dedicated to the sensing node; or CSI-RS resources dedicated to the sensing node; or other, potentially common, reference signals, e.g., Synchronization Signal Block (SSB). The CSI may be represented by different metrics, such as Channel Quality Indicator (CQI), Reference Signal Received Power (RSRP), or Precoding Matrix Indicator (PMI), or specifically defined metrics, such as the use of autoencoder for representing meaningful features of a channel.

If the CSI estimate changes by a predetermined threshold from the recent CSI estimate, the sensing node 604 may report the observation. The change, for example, may be estimated by computing a distance or dissimilarity measure between two CSIs. The distance or dissimilarity measure may be configured by the network and signaled to the sensing node 604. Some dissimilarity measures may be specified in the standard and stored in the sensing node and the network may specify corresponding parameters of the measurement, or simply the index of the metric to be used by the sensing node 604. Different metrics, for example, may serve different purposes. The predetermined threshold to be used for comparing the CSI may also be signaled to the sensing node 604. Default threshold(s) may be specified by the standard and stored in the sensing node 604 and the network can dynamically adjust these threshold.

Figure 10:
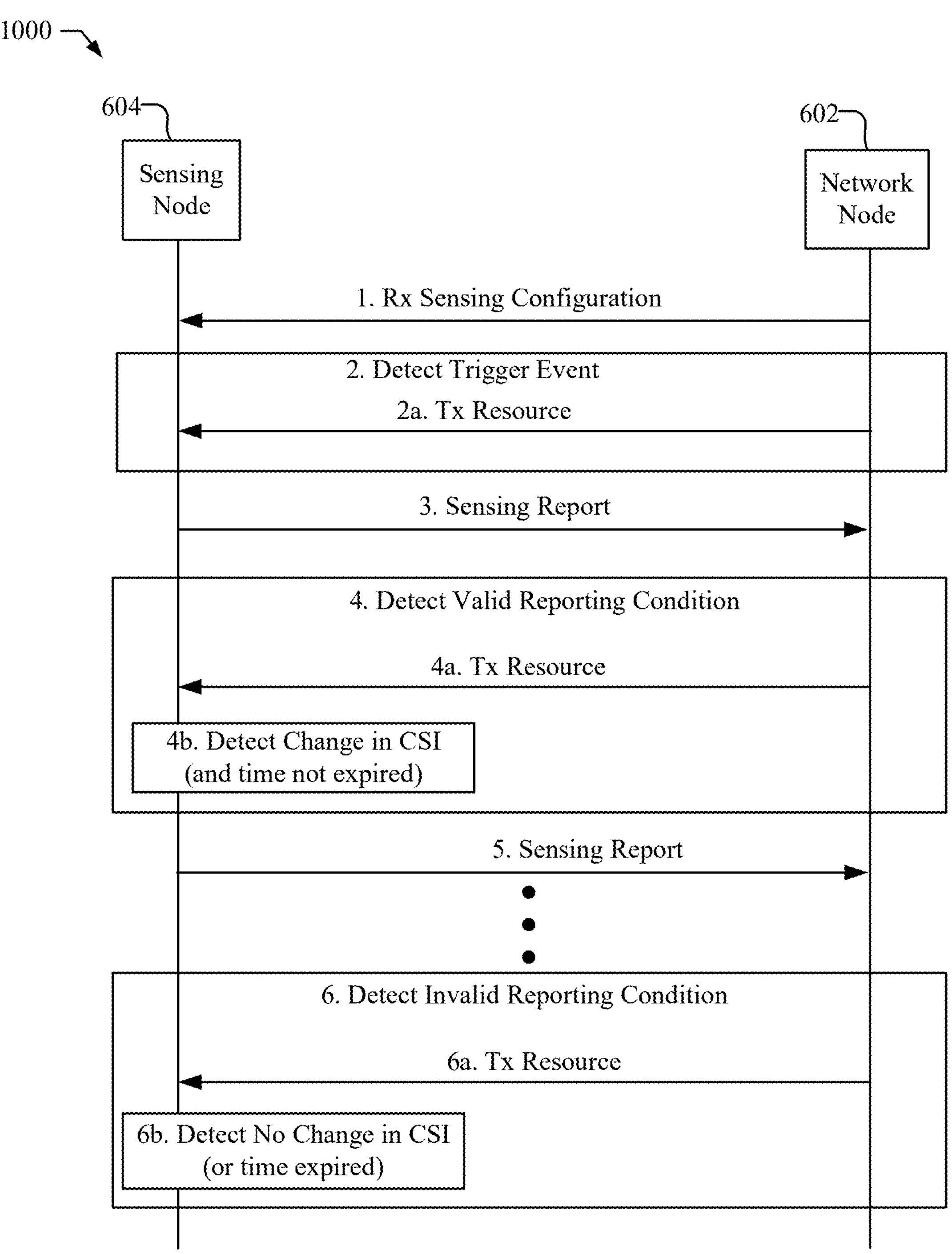
FIG. 10 illustrates is a message flow between the network node and the sensing node to support sensing reporting based on a valid channel state information (CSI) reporting configuration.

FIG. 10 illustrates a message flow between the network node 602 and the sensing node 604 illustrated in FIG. 6, to support sensing based on a valid channel state information (CSI) reporting configuration. The network, e.g., network node 602, configures the sensing node 604 with CSI-based event reporting based on observed distances between CSI samples. As discussed in reference to FIG. 7, the network node 602 may be a base station, such as a base station 102 shown in FIG. 1, or may be a sensing server, such as sensing server 172 shown in FIG. 1. The sensing node 604, for example, may be a UE, such as UE 104 shown in FIG. 1 or a base station, such as base station 102 shown in FIG. 1. While not illustrated in FIG. 10, the message flow 1000 may include additional nodes. For example, if the network node 602 is a sensing server, an additional network node in the form of a base station may be present to communicate with the sensing node 604 and to transmit sensing-purpose beams. The procedure illustrated in FIG. 10 may be used in support of RF sensing, such as mono-static or bi-static radar sensing of the target object 601, e.g., as discussed in reference to FIG. 6. It should be understood that FIG. 10 illustrates messages that may be transmitted in support of RF sensing but may not include all messages or actions performed during the RF sensing, and additionally include messages or actions that are provided for the sake of completeness, but may not be necessary for RF sensing.

At stage 1, the network node 602 provides receive (Rx) sensing configuration to the sensing node 604. The Rx sensing configuration, for example, may be provided along with the sensing-purpose beam measurement configuration in stage 1 of FIG. 6, or may be provided in a separate message. The configuration, for example, may include the dissimilarity or distance CSI metric to be used by the sensing node 604. The distance may be chosen from a set of pe-configured measures, e.g., defined in a standard and stored in the sensing node 604, or determined through a set of parameters that are signaled from the network node 602 to the sensing node 604. For example, the distances between two CSI may be obtained by measuring the Euclidean distance between their corresponding representations, where each representation is obtained by an autoencoder. The autoencoder takes the CSI (e.g., Channel Frequency Response (CFR) or Channel Impulse Response CIR)) as input and provides the CSI representation. The autoencoder parameters may be signaled by the network node 602. In another example, other classical metrics may be used, such as CQI, RSRP, or PMI.

Additionally, the configuration provided in stage 1 may further include the threshold to be used for comparing the CSIs. The threshold value will depend on the specific metric signaled by the network node 602. For example, if the Euclidean distance between two corresponding CSI representations exceeds X, a sensing report is triggered. The value X may be signaled by the network node 602. By way of example, the difference in CQI values may be compared to a reference threshold X. In another example, the difference in RSRP values may be compared to a reference threshold X. Default threshold(s) may be specified, e.g., in a standard and stored in the sensing node 604, and the network node 602 may dynamically adjust these thresholds. The threshold may be per beam if the distance measure is applied per beam.

The configuration provided in stage 1 may further include the resources used for CSI measurement. The resources may be specific to the sensing node 604, such as UE-specific CSI-RS or UE-specific sensing reference signals, on-demand PRS, etc. The resources may be common reference signals, such as SSB, PRS, etc. Additionally, the configuration may include the filtering configuration to be used by the sensing node 604 and the number of measurement samples for each instance computation. For example, the configuration may indicate that M PRS samples are to be used for CSI estimation.

The configuration provided in stage 1 may further include the beams to be used for sensing. For example, if the reference signal (RS) is beam-swept, the network node 602 may configure the sensing node 604 to use, e.g., a single metric that is a function of all beams. In another example, the network node 602 may configure the sensing node 604 to use a per beam distance evaluation, in which the sensing node 604 compares the CSI differences on the same beam and reports to the network node 602 if the CSI difference for a beam exceeds a predetermined threshold.

The configuration provided in stage 1 may further include the reporting frequency. For example, the sensing node 604 may be configured to report whenever the CSI difference between any two consecutive instants exceeds a threshold When an event is detected, the following reporting can be conditional on the time of the initial detection. For example, the sensing node 604 may keep reporting as long as the difference is above the threshold and a timer initiated at the initial detection does not expire. As an example, the sensing node 604 may compute CSI at times t0, t1, t2, t3. The difference between the CSI at time t1 and to may be greater than threshold X (|CSI (t1)−CSI(t0)|>X), the difference between the CSI at time t2 and t0 may be greater than threshold X (|CSI(t2)−CSI(t0)|>X), and the difference between the CSI at time t3 and t0 may be greater than threshold X (|CSI(t3)−CSI(t0)|>X), and the configured timer window may be less than t3−t1, but greater than t2−t1. the sensing node 604 would then only report the detection for the instants t1, t2, but not t3. The sensing node 604 may continue reporting until a change is below another threshold, e.g., X2, where X>X2, and X2 may be included in the configuration in stage 1. For example, the sensing node 604 starts reporting when a large change is detected (CSI distance>X), and continues to report until the CSI distance<X2.

The initial configuration of the CSI-based reporting provided in stage 1 may be RRC based, and updates of different parameters may be provided through RRC, Medium Access Control-Control Element (MAC CE), or downlink Control Information (DCI).

For example, as illustrated in stage 2 of FIG. 10, the sensing node 604 detects the presence of a trigger event based on the reception of the transmit (Tx) resource in stage 2*a*. For example, the sensing node 604 may receive the Tx resource and compare the measured CSI to a previously acquired CSI, to determine if a measured dissimilarity or distance CSI metric exceeds the predetermined threshold. In stage 2, it is assumed that the dissimilarity or distance CSI metric exceeds the predetermined threshold.

In stage 3 of FIG. 10, the sensing node 604 sends a sensing report to the network node 602 (or to another network node). The sensing report may include information about the distance difference, or in some implementations, may only indicate the occurrence of the event. The sensing report may further contain a timestamp, beam index (if configured), information of potential detected target objects such as range and angle, or any combination of the foregoing.

In stage 4 of FIG. 10, the sensing node 604 detects the presence of a valid reporting condition based on the reception of the transmit (Tx) resource in stage 4*a*. For example, at stage 4*b*, the sensing node 604 may detect whether there is a change in CSI with respect to a previously measured CSI, such in stage 2, that exceeds a predetermined threshold provided in stage 1. In some implementations, the sensing node 604 may further determine whether a timer has expired, e.g., as provided in stage 1.

In stage 5 of FIG. 10, the sensing node 604 sends a sensing report to the network node 602 (or to another network node), e.g., as discussed in stage 3. The sensing node 604 may continue to detect valid reporting conditions and sending sensing reports, until no change is detected or the time has expired.

In stage 6 of FIG. 10, for example, the sensing detects an invalid reporting condition based on the reception of the transmit resource in stage 6*a* . . . . For example, at stage 6*b*, the sensing node 604 may detect that there is no change in CSI with respect to a previously measured CSI, such in stage 2 or that any change is below a second predetermined threshold provided in stage 1. In some implementations, the sensing node 604 may additionally or alternatively determine that a timer has expired, e.g., as provided in stage 1. As the reporting condition is invalid, no sensing report is sent following stage 6.

In general, the transmitter node (illustrated as network node 602 in FIG. 10) may be a base station (TRP) or a UE, and the receiving node (illustrated as sensing node 604 in FIG. 10) may be a base station or a UE. Thus, the monitored link may be a TRP-UE (Uu) link, a UE-UE (SL) link, or a TRP-TRP link. For example, a TRP may be configured to monitor the CSI from another TRP, (e.g., two TRPs monitoring an intersection). The receiving TRP may not be in line of sight of the transmitting TRP beam, but due to presence of reflecting objects in the environment, the receiving TRP can receive signals reflecting off objects and measure a corresponding change in its CSI estimate, and report back the detection to the sensing server. In another example, the network node 602 may configure a UE to monitor a SL UE link, e.g., there may be two RSU units that are configured by the network. In another example, the configuration can be communicated from one UE to another SL UE, without network assistance.

Based on receiving the event-triggered sensing report, the network node 602 may initiate a follow-up sensing session. Alternatively, the network node 602 may configure the sensing node 604 with CSI-difference-based reference signal (RS) transmission. The sensing node 604 may be assigned dedicated sensing resources to minimize the latency for generating sensing results. The network node 602 being aware of the transmission schedule, monitors the RS signal at the scheduled resources. The network node 602 may configures the sensing node 604 to autonomously transmit RS signals Ns slots after the report transmission. The frequency and time resources may be configured by a network server, such as sensing server 172. This procedure enhances the sensing latency, as the sensing RS is transmitted as soon as the event is detected, and the network node 602 may process more refined measurements accordingly.

Figure 11:
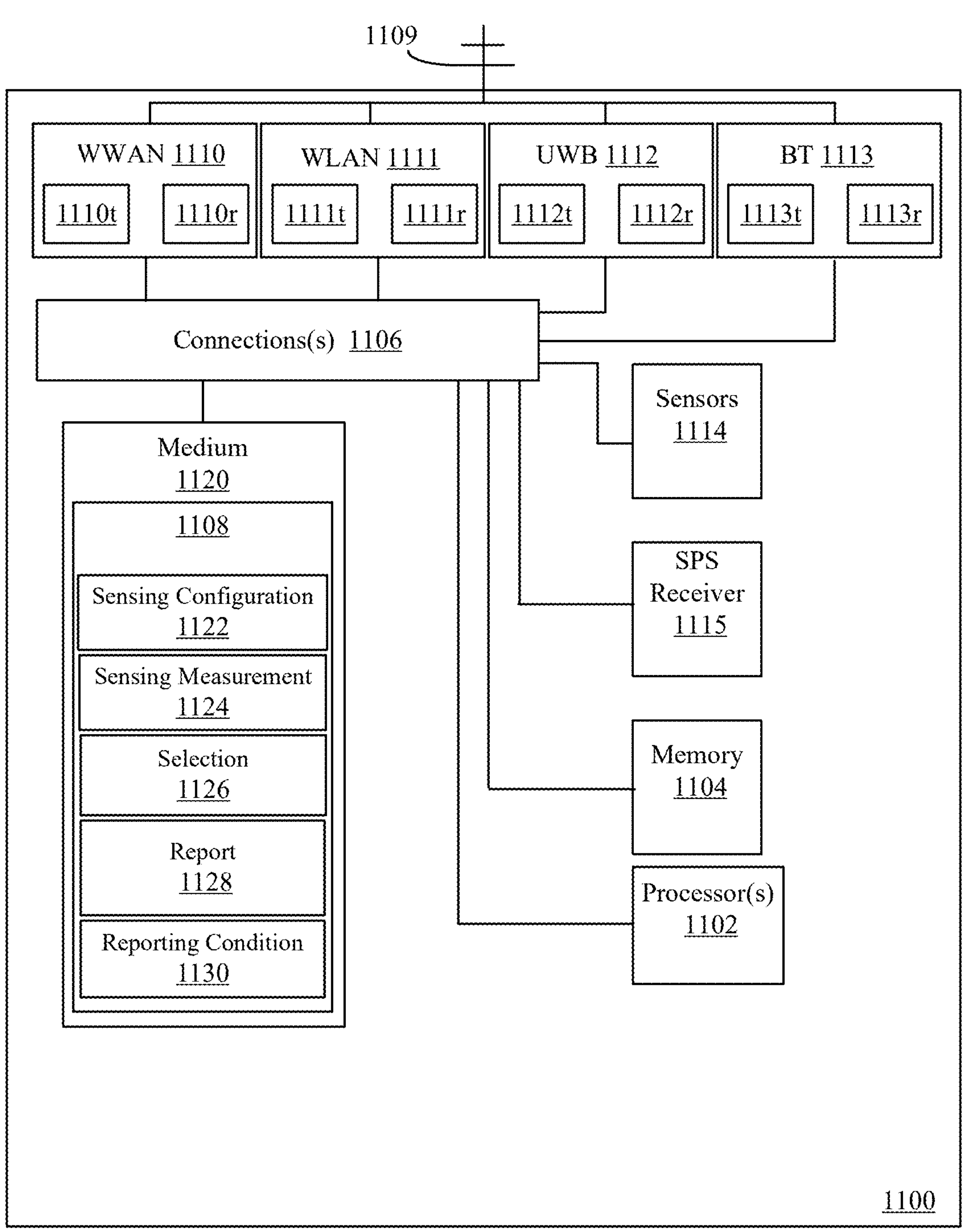
FIG. 11 illustrates a schematic block diagram of certain exemplary features of a sensing node that supports sensing beam selection based on a sensing-purpose beam measurement configuration and/or reporting based on a valid CSI reporting configuration.

FIG. 11 shows a schematic block diagram illustrating certain exemplary features of a sensing node 1100, e.g., which may be UE 104 or base station 102 shown in FIG. 1, or the sensing node 604 shown in FIGS. 6, 7, and 10, and that supports sensing beam selection based on a sensing-purpose beam measurement configuration and/or reporting based on a valid CSI reporting configuration, as described herein. The sensing node 1100, for example, may perform the message flows 700 and 1000 shown in FIGS. 7 and 10, respectively, and the process flow 1300 shown in FIG. 13 and accompanying techniques as discussed herein. The sensing node 1100 may include, for example, one or more processors 1102, memory 1104, an external interface such as at least one wireless transceivers (e.g., wireless network interface) illustrated as WWAN transceiver 1110, WLAN transceiver 1111, an Ultra-Wideband (UWB) transceiver 1112 and a Bluetooth (BT) transceiver 1113, SPS receiver 1115, and one or more sensors 1114, which may be operatively coupled with one or more connections 1106 (e.g., buses, lines, fibers, links, etc.) to non-transitory computer readable medium 1120 and memory 1104. The SPS receiver 1115, for example, may receive and process SPS signals from satellite vehicles. The one or more sensors 1114, for example, may be an inertial measurement unit (IMU) that may include one or more accelerometers, one or more gyroscopes, a magnetometer, etc. The sensing node 1100 may further include additional items, which are not shown, such as a user interface that may include e.g., a display, a keypad or other input device, such as virtual keypad on the display, through which a user may interface with the sensing node. In certain example implementations, all or part of sensing node 1100 may take the form of a chipset, and/or the like. It should be understood that in certain implementations, one or more components may not be included in the sensing node 1100. As an example, if the sensing node 1100 is a base station, some components, such as SPS receiver 1115, sensors 1114, and one or more of the transceivers, such as BT transceiver, may not be included.

The sensing node 1100 may include at least one wireless transceiver, such as wireless transceiver 1110 for a WWAN communication system and wireless transceiver 1111 for a WLAN communication system, UWB transceiver 1112 for a UWB communication system, BT transceiver 1113 for a Bluetooth communication system, or a combined transceiver for any of WWAN, WLAN, UWB, and BT. The WWAN transceiver 1110 may include a transmitter **1110*t* and receiver 1110*r* coupled to one or more antennas 1109 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 1111 may include a transmitter 1111*t* and receiver 1111*r* coupled to one or more antennas 1109 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The UWB transceiver 1112 may include a transmitter 1112*t* and receiver 1112*r* coupled to one or more antennas 1109 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The BT transceiver 1113 may include a transmitter 1113*t* and receiver 1113*r* coupled to one or more antennas 1109 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 1110*t*, 1111*t*, 1112*t*, and 1113*t* may include multiple transmitters that may be discrete components or combined/integrated components, and/or the receivers 1110*r*, 1111*r*, 1112*r*, and 1113*r* may include multiple receivers that may be discrete components or combined/integrated components. The WWAN transceiver 1110 may be configured to communicate signals (e.g., with base stations and/or one or more other devices) according to a variety of radio access technologies (RATs) such as 11G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHZ frequencies. The WLAN transceiver 1111 may be configured to communicate signals (e.g., with access points and/or one or more other devices) according to a variety of radio access technologies (RATs) such as 3GPP LTE-V2X (PC5), IEEE 1102.11 (including IEEE 1102.11p), WiFi, WiFi Direct (WiFi-D), Zigbee etc. The UWB transceiver 1112 may be configured to communicate signals (e.g., with access points and/or one or more other devices) according to a variety of radio access technologies (RATs) such as personal area network (PAN) including IEEE 802.15.3, IEEE 802.15.4, etc. The BT transceiver 1113 may be configured to communicate signals (e.g., with access points and/or one or more other devices) according to a variety of radio access technologies (RATs) such as a Bluetooth® network. The transceivers 1110 1111, 1112, and 1113 may be communicatively coupled to a transceiver interface, e.g., by optical and/or electrical connection, which may be at least partially integrated with the transceivers 1110, 1111, 1112, 1113**.

In some embodiments, sensing node 1100 may include antenna 1109, which may be internal or external. Sensing node antenna 1109 may be used to transmit and/or receive signals processed by wireless transceivers 1110, 1111, 1112, 1113. In some embodiments, sensing node antenna 1109 may be coupled to wireless transceivers 1110, 1111, 1112, 1113. In some embodiments, measurements of signals received (transmitted) by sensing node 1100 may be performed at the point of connection of the sensing node antenna 1109 and wireless transceivers 1110, 1111, 1112, 1113. For example, the measurement point of reference for received (transmitted) RF signal measurements may be an input (output) sensing node of the receiver 1110*r* (transmitter 1110*t*) and an output (input) sensing node of the sensing node antenna 1109. In a sensing node 1100 with multiple sensing node antennas 1109 or antenna arrays, the antenna connector may be viewed as a virtual point representing the aggregate output (input) of multiple sensing node antennas.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of sensing node 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in sensing node 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in sensing node 1100 is merely exemplary, and as such the functionality of the modules and/or data structures may be combined, separated, and/or be structured in different ways depending upon the implementation of the sensing node 1100.

The medium 1120 and/or memory 1104 may include a sensing configuration module 1122 that when implemented by the one or more processors 1102 configures the one or more processors 1102 to receive, via the external interface including one or more of wireless transceivers 1110, 1111, 1112, and 1113, sensing-purpose beam measurement configuration as discussed herein, including in FIG. 6-10. The sensing-purpose beam measurement configuration, for example, may be received from a network node, such as a base station or server, and may include, e.g., resources for sensing-purpose beams, measurement metrics for measuring the sensing-purpose beams, criterion for target path determination, a minimum absolute or relative delay with respect to a LOS path for the target path determination, a quantity of target paths to be included in the sensing-purpose beam measurement report, a report format for each of the one or more selected sensing-purpose beams, and any combination thereof. Additionally, the one or more processors 1102 may be configured to receive, via the external interface including one or more of wireless transceivers 1110, 1111, 1112, and 1113, a valid reporting condition, which may include, e.g., a channel state information change metric, threshold, reporting frequency, etc., as discussed in reference to FIG. 10.

The medium 1120 and/or memory 1104 may include a sensing measurement module 1124 that when implemented by the one or more processors 1102 configures the one or more processors 1102 to receive, via the external interface including one or more of wireless transceivers 1110, 1111, 1112, and 1113, and measure a plurality of sensing-purpose beams received from a transmitting entity, such as the network node 602, e.g., as discussed herein, including in reference to FIGS. 6-10. For example, the one or more processors 1102 may be configured to identify LOS paths and NLOS paths in each of the received sensing-purpose beams, e.g., based on delay, determine target paths, e.g., based on the delay or Doppler frequency signature, which may include a micro Doppler profile, and determine a measurement metric, e.g., signal strength such as sensing RSPR or sensing SINR, and the delay for the target paths, e.g., excluding the LOS path and NLOS paths that are not associated with the target, as discussed in reference to FIGS. 6-9. The one or more processors 1102 may be further configured to determine an absolute delay or relative delay of the target paths with respect to the LOS path of the sensing-purpose beam, as discussed in reference to FIGS. 6-9.

The medium 1120 and/or memory 1104 may include a selection module 1126 that when implemented by the one or more processors 1102 configures the one or more processors 1102 to select one or more sensing-purpose beams for sensing the target from the plurality of sensing-purpose beams based on at least the sensing-purpose beam measurement configuration, e.g., as discussed herein, including in reference to FIGS. 6-10.

The medium 1120 and/or memory 1104 may include a report module 1128 that when implemented by the one or more processors 1102 configures the one or more processors 1102 to send a report, e.g., via the external interface including one or more of wireless transceivers 1110, 1111, 1112, and 1113, to a sensing-purpose beam measurement report to the network node, e.g., base station or server, e.g., as discussed herein, including in reference to FIGS. 6-10. The sensing-purpose beam measurement report, for example, may include at least an identification of each of the one or more selected sensing-purpose beams, a measurement metric, such as sensing RSRP or sensing SINR for the selected sensing-purpose beams, the absolute delay with respect to a transmission time of the sensing-purpose beam, or a relative delay with respect to the LOS path, or any combination thereof. The report may further include an identification of a different sensing-purpose beam if used to determine a relative delay. The one or more processors 1102 may be configured to send a sensing report if valid reporting conditions are determined.

The medium 1120 and/or memory 1104 may include a reporting condition module 1130 that when implemented by the one or more processors 1102 configures the one or more processors 1102 to determine whether a valid reporting condition is present, e.g., based on a received valid reporting configuration and determined changes in channel state information in measurements of the plurality of sensing-purpose beams with respect to a previous measurements of the plurality of sensing-purpose beams, e.g., as discussed in reference to FIG. 10. The one or more processors 1102 may be further configured to determine if valid reporting conditions are present based on time, e.g., as discussed in reference to FIG. 10.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program code 1108. For example, the non-transitory computer readable medium including program code 1108 stored thereon may include program code 1108 to support sensing beam selection based on a sensing-purpose beam measurement configuration and/or reporting based on a valid CSI reporting configuration in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include an external interface including one or more of wireless transceivers 1110, 1111, 1112, and 1113 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable program code 1108 stored thereon, which if executed by one or more processors 1102 may be operatively enabled to perform all or portions of the example operations as described herein. Computer readable medium 1120 may be a part of memory 1104.

Figure 12:
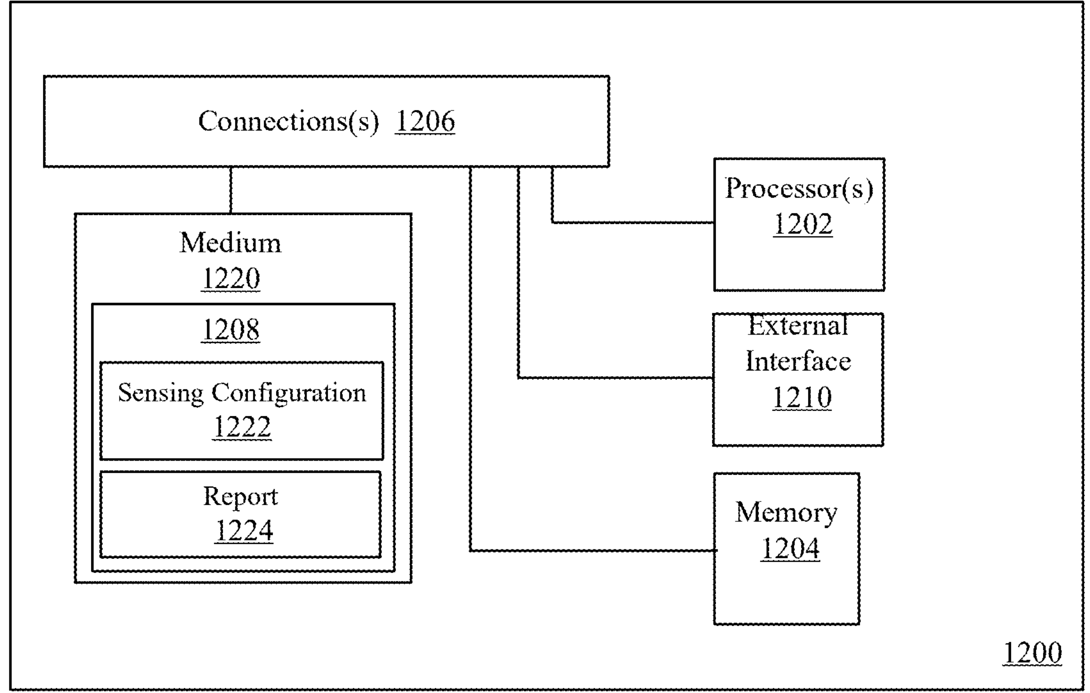
FIG. 12 illustrates a schematic block diagram of certain exemplary features of a network node that supports sensing beam selection by a sensing node based on a sensing-purpose beam measurement configuration and/or reporting based on a valid CSI reporting configuration.

FIG. 12 shows a schematic block diagram illustrating certain exemplary features of a network node 1200, e.g., which may be, e.g., the base station 102 and/or sensing server 172 in FIG. 1, or network node 602 in FIGS. 6, 7, and 10, and that supports sensing beam selection by a sensing node, such as a UE or base station, based on a sensing-purpose beam measurement configuration and/or reporting based on a valid CSI reporting configuration, as described herein. The network node 1200, for example, may perform the message flows 700 and 1000 shown in FIGS. 7 and 10, and the process flow 1400 shown in FIG. 14 and accompanying techniques as discussed herein. The network node 1200 may include, for example, one or more processors 1202 and memory 1204, an external interface 1210, which may be operatively coupled with one or more connections 1206 (e.g., buses, lines, fibers, links, etc.) to non-transitory computer readable medium 1220 and memory 1204. The external interface 1210 may be a wired and/or wireless interface capable of connecting to network entities in the core network 170, through which the network node 1200 may communicate sensing nodes, such as UEs or base stations, or if the network node is, e.g., a base station, the external interface 1210 may be wireless transceiver configured to communicate signals (e.g., with sensing nodes) according to a variety of radio access technologies (RATs). The network node 1200 may further include additional items, which are not shown, such as a user interface that may include e.g., a display, a keypad or other input device, such as virtual keypad on the display, through which a user may interface with the network node. In certain example implementations, all or part of network node 1200 may take the form of a chipset, and/or the like.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of network node 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in network node 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in network node 1200 is merely exemplary, and as such the functionality of the modules and/or data structures may be combined, separated, and/or be structured in different ways depending upon the implementation of the network node 1200.

The medium 1220 and/or memory 1204 may include a sensing configuration module 1122 that when implemented by the one or more processors 1202 configures the one or more processors 1202 to generate and send, via the external interface 1210, sensing-purpose beam measurement configuration as discussed herein, including in FIG. 6-10. The sensing-purpose beam measurement configuration enables the sensing node to select one or more sensing-purpose beams, from a plurality of sensing-purpose beams received by the sensing node. The sensing-purpose beam measurement configuration, for example, may be received from a network node, such as a base station or server, and may include, e.g., resources for sensing-purpose beams, measurement metrics for measuring the sensing-purpose beams, criterion for target path determination, a minimum absolute or relative delay with respect to a LOS path for the target path determination, a quantity of target paths to be included in the sensing-purpose beam measurement report, a report format for each of the one or more selected sensing-purpose beams, and any combination thereof. Additionally, the one or more processors 1202 may be configured to generate and send, via the external interface 1210, a valid reporting condition for the sensing node, which may include, e.g., a channel state information change metric, threshold, reporting frequency, etc., as discussed in reference to FIG. 10.

The medium 1220 and/or memory 1204 may include a report module 1224 that when implemented by the one or more processors 1202 configures the one or more processors 1202 to receive, via the external interface 1210, from the sensing node a sensing-purpose beam measurement report that includes at least an identification of each of sensing-purpose beams selected for sensing by the sensing node, e.g., as discussed herein, including in reference to FIGS. 6-10. The sensing-purpose beam measurement report, for example, may include in addition to the identification of each of the selected sensing-purpose beams, a measurement metric, such as sensing RSRP or sensing SINR for the selected sensing-purpose beams, the absolute delay with respect to a transmission time of the sensing-purpose beam, or a relative delay with respect to the LOS path, or any combination thereof. The report may further include an identification of a different sensing-purpose beam if used to determine a relative delay.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program code 1208. For example, the non-transitory computer readable medium including program code 1208 stored thereon may include program code 1208 to support sensing beam selection by a sensing node based on a sensing-purpose beam measurement configuration and/or reporting based on a valid CSI reporting configuration in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include the external interface 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable program code 1208 stored thereon, which if executed by one or more processors 1202 may be operatively enabled to perform all or portions of the example operations as described herein. Computer readable medium 1220 may be a part of memory 1204.

Figure 13:
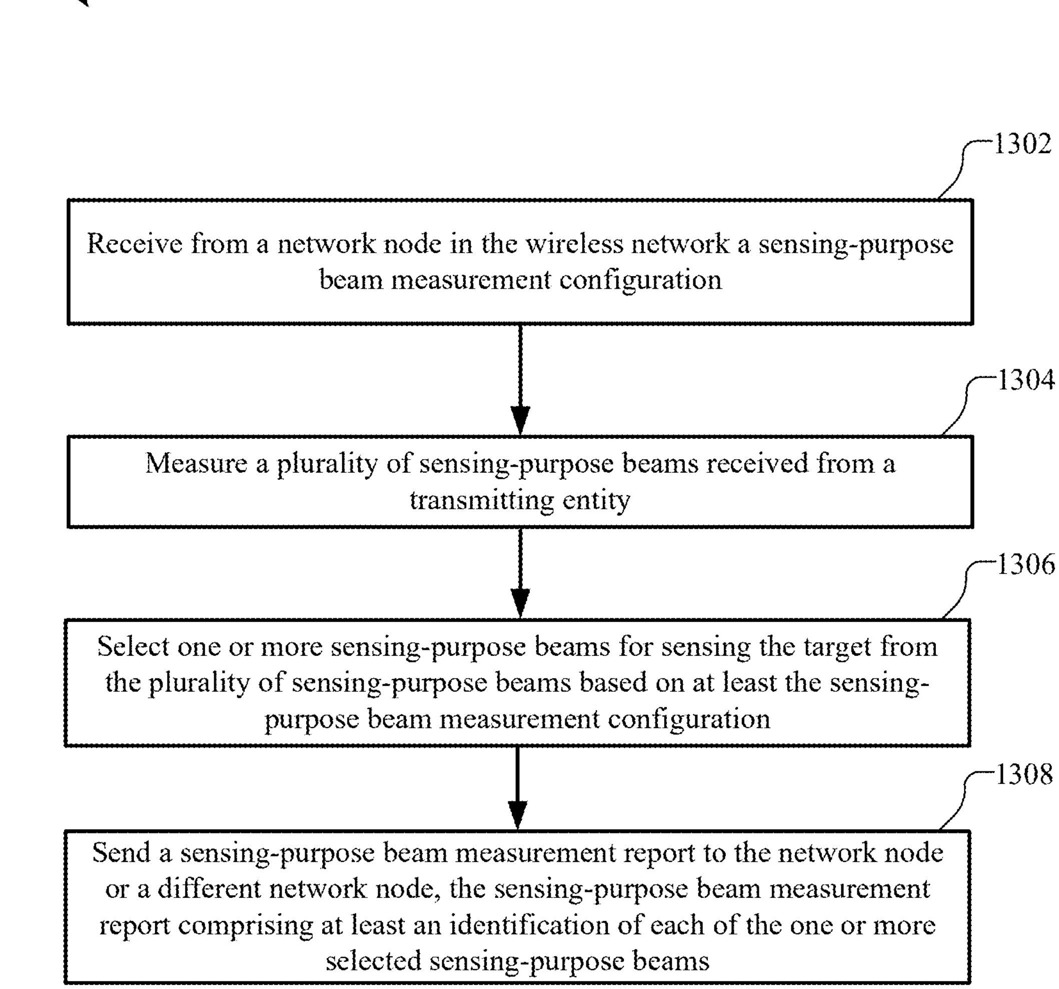
FIG. 13 shows a flowchart for an exemplary process for supporting RF sensing in a wireless network by a sensing node.

FIG. 13 is a flow chart illustrating a method 1300 for supporting radio frequency (RF) sensing in the wireless network, performed by a sensing node, such as UE 104 or base station 102, sensing node 604, or sensing node 1100, as described herein.

At block 1302, the sensing node receives from a network node in the wireless network a sensing-purpose beam measurement configuration, e.g., as described in stage 1 of FIG. 7. A means for receiving from a network node in the wireless network a sensing-purpose beam measurement configuration may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing configuration module 1122, shown in FIG. 11.

At block 1304, the sensing node measures a plurality of sensing-purpose beams received from a transmitting entity, e.g., as described in stages 2 and 3 of FIG. 7. A means for measuring a plurality of sensing-purpose beams received from a transmitting entity may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

At block 1306, the sensing node selects one or more sensing-purpose beams for sensing the target from the plurality of sensing-purpose beams based on at least the sensing-purpose beam measurement configuration, e.g., as described in stage 3 of FIG. 7. A means for selecting one or more sensing-purpose beams for sensing the target from the plurality of sensing-purpose beams based on at least the sensing-purpose beam measurement configuration may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the selection module 1126, shown in FIG. 11.

At block 1308, the sensing node sends a sensing-purpose beam measurement report to the network node or a different network node, the sensing-purpose beam measurement report comprising at least an identification of each of the one or more selected sensing-purpose beams, e.g., as described in stage 4 of FIG. 7. A means for sending a sensing-purpose beam measurement report to the network node or a different network node, the sensing-purpose beam measurement report comprising at least an identification of each of the one or more selected sensing-purpose beams may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the report module 1128, shown in FIG. 11.

In one implementation, for example, the sensing-purpose beam measurement configuration may include at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof, e.g., as discussed in reference to stage 1 of FIG. 7. For example, the resources for the sensing-purpose beams may include a sensing signal resource set, wherein each sensing signal resource in the sensing signal resource set comprises a sensing-purpose beam, e.g., as discussed in reference to stage 1 of FIG. 7. The measurement metrics for measuring the sensing-purpose beams may include identification of at least one of sensing Reference Signal Received Power (RSRP) or sensing Signal-to-Interference-plus-Noise ratio (SINR), e.g., as discussed in reference to stage 1 of FIG. 7. The criterion for target path determination may include at least one of a largest power non-line of sight (NLOS) path, a Doppler frequency signature, or a combination thereof, e.g., as discussed in reference to stage 1 of FIG. 7. The report format for each of the one or more selected sensing-purpose beams may include a sensing signal resource identifier (ID), at least one of a sensing Reference Signal Received Power (RSRP), a sensing Signal-to-Interference-plus-Noise ratio (SINR), an absolute delay with respect to a transmission time of the sensing-purpose beam, a relative delay with respect to the LOS path, or any combination thereof, e.g., as discussed in reference to stage 1 of FIG. 7.

In one implementation, the sensing node may measure the plurality of sensing-purpose beams received from the transmitting entity by receiving each of the sensing-purpose beams, e.g., as described in stage 2 of FIG. 7. The sensing node may identify one or more paths comprising line of sight (LOS) path and non-LOS (NLOS) paths in each of the sensing-purpose beams based on delay, e.g., as described in stage 3 of FIG. 7. The sensing node may determine one or more target paths from identified one or more paths in each of the sensing-purpose beams, e.g., as described in stage 3 of FIG. 7, and determine a measurement metric and the delay for the one or more target paths, e.g., as described in stage 3 of FIG. 7. A means for measuring the plurality of sensing-purpose beams received from the transmitting entity by receiving each of the sensing-purpose beams may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11. A means for identifying one or more paths comprising line of sight (LOS) path and non-LOS (NLOS) paths in each of the sensing-purpose beams based on delay may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11. A means for determining one or more target paths from identified one or more paths in each of the sensing-purpose beams may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11. A means for determining a measurement metric and the delay for the one or more target paths may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

For example, in one implementation, the sensing node may determine the one or more target paths by matching a Doppler frequency signature in NLOS paths to a configured Doppler frequency signature for the target, e.g., as described in stage 3 of FIG. 7. A means for matching a Doppler frequency signature in NLOS paths to a configured Doppler frequency signature for the target may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

In one implementation, the sensing node may determine the one or more target paths by detecting delays in background paths in each of the sensing-purpose beams without the target being present, e.g., as described in stage 3 of FIG. 7. The sensing node may determine the one or more target paths based at least partially on the one or more paths in each of the sensing-purpose beams with the delay that is not equal to the delays in the background paths, e.g., as described in stage 3 of FIG. 7. A means for detecting delays in background paths in each of the sensing-purpose beams without the target being present may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11. A means for determining the one or more target paths based at least partially on the one or more paths in each of the sensing-purpose beams with the delay that is not equal to the delays in the background paths may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

In one implementation, the sensing node may determine the one or more target paths by receiving an indication of a minimum delay for a target path, e.g., as described in stage 3 of FIG. 7. The sensing node may determine the one or more target paths based at least partially on the one or more paths in each of the sensing-purpose beams with the delay that is greater than the minimum delay, e.g., as described in stage 3 of FIG. 7. A means for receiving an indication of a minimum delay for a target path may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing configuration module 1122, shown in FIG. 11. A means for determining the one or more target paths based at least partially on the one or more paths in each of the sensing-purpose beams with the delay that is greater than the minimum delay may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

In one implementation, the sensing node may determine the measurement metric for each target path associated with a sensing-purpose beam by determining an indication of signal strength for only the target path that excludes the LOS path and non-LOS paths unassociated with the target, e.g., as described in stage 3 of FIG. 7. A means for determining an indication of signal strength for only the target path that excludes the LOS path and non-LOS paths unassociated with the target may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11.

In one implementation, the sensing node may determine the delay for each target path associated with a sensing-purpose beam by determining one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam, e.g., as described in stage 3 of FIG. 7 and in FIG. 8. A means for determining one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing measurement module 1124, shown in FIG. 11

In one implementation, the sensing node may select the one or more sensing-purpose beams for sensing the target from the plurality of sensing-purpose beams based on at least the sensing-purpose beam measurement configuration by selecting a configured number of target paths based on the measurement metric for each of the one or more target paths, e.g., as described in stages 1 and 3 of FIG. 7. The sensing-purpose beam measurement report may include the identification of a sensing-purpose beam associated with each selected target path, and the measurement metric and the delay associated with each selected target path, e.g., as described in stage 4 of FIG. 7. In one implementation, the delay associated with at least one selected target path may be a relative delay of the selected target path with respect to the LOS path of a different sensing-purpose beam, and the sensing-purpose beam measurement report further comprises an identification of the different sensing-purpose beam, e.g., as described in stages 3 and 4 of FIG. 7 and FIG. 8.

In one implementation, the sensing node may receive a valid reporting configuration, e.g., as described in stage 1 of FIG. 10. The sensing node may determine whether a valid reporting condition is present based at least in part on the valid reporting configuration and a change in channel state information in measurements of the plurality of sensing-purpose beams with respect to a previous measurements of the plurality of sensing-purpose beams, e.g., as described in 1, 2, and 4 of FIG. 10. For example, the valid reporting configuration may include a channel state information change metric comprising at least one of a Channel Quality Indicator (CQI), Reference Signal Received Power (RSRP), or Precoding Matrix Indicator (PMI), e.g., as described in 1, 2, and 4 of FIG. 10. The sensing-purpose beam measurement report is sent if the valid reporting condition is present, e.g., e.g., as described in stages 1, 2, 3, 4, and 5 of FIG. 10. A means for receiving a valid reporting configuration may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the sensing configuration module 1122, shown in FIG. 11. A means for determining whether a valid reporting condition is present based at least in part on the valid reporting configuration and a change in channel state information in measurements of the plurality of sensing-purpose beams with respect to a previous measurements of the plurality of sensing-purpose beams may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the reporting condition module 1130, shown in FIG. 11.

In one implementation, the sensing node determines whether the valid reporting condition is present by determining the change in the channel state information in measurements of the plurality of sensing-purpose beams with respect to the previous measurements of the plurality of sensing-purpose beams, e.g., as described in stages 1, 2, and 4 of FIG. 10. The sensing node may further determine whether the change in the channel state information is greater than a threshold, e.g., as described in stages 1, 2, and 4 of FIG. 10. A means for determining the change in the channel state information in measurements of the plurality of sensing-purpose beams with respect to the previous measurements of the plurality of sensing-purpose beams may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the reporting condition module 1130, shown in FIG. 11. A means for determining whether the change in the channel state information is greater than a threshold may include the external interface including one or more of wireless transceivers 1110, 1111, 1112, and 1113, along with one or more processors 1102 with dedicated hardware or implementing executable code or software instructions in memory 1104 and/or medium 1120 in sensing node 1100, such as the reporting condition module 1130, shown in FIG. 11.

In one implementation, the sensing node in the wireless network may be one of a sensing base station, such as base station 102 or network node 602, and a user equipment (UE), such as UE 104 or sensing node 604; the network node in the wireless network may be one of a transmitting base station, such as a base station 102, network node 602, or a server, such as sensing server 172; and the different network node may be one of the transmitting base station, such as base station 102 or network node 602, and the server, such as sensing server 172.

Figure 14:
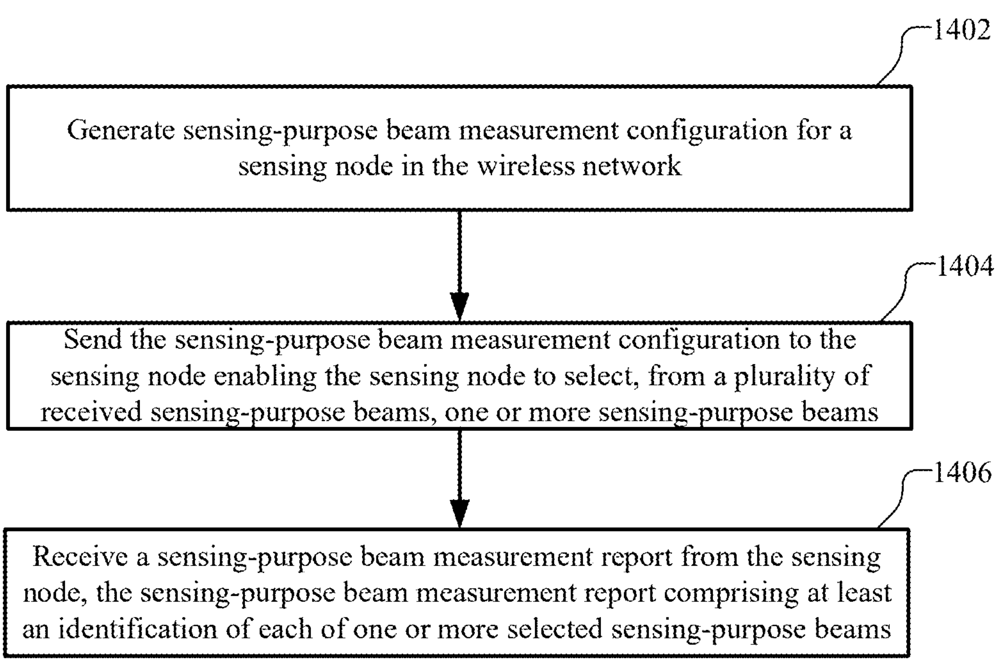
FIG. 14 shows a flowchart for an exemplary process for supporting RF sensing in a wireless network by a network node.

FIG. 14 is a flow chart illustrating a method 1400 for supporting radio frequency (RF) sensing in the wireless network, performed by a network node, such as a base station 102, sensing server 172, network node 602, or network node 1200, as described herein.

At block 1402, the network node generates sensing-purpose beam measurement configuration for a sensing node in the wireless network, e.g., as discussed in stage 1 of FIG. 7. A means for generating sensing-purpose beam measurement configuration for a sensing node in the wireless network may include the one or more processors 1202 with dedicated hardware or implementing executable code or software instructions in memory 1204 and/or medium 1220 in network node 1200, such as the sensing configuration module 1222, shown in FIG. 12.

At block 1404, the network node sends the sensing-purpose beam measurement configuration to the sensing node enabling the sensing node to select, from a plurality of received sensing-purpose beams, one or more sensing-purpose beams, e.g., as discussed in stages 2 and 3 of FIG. 7. A means for sending the sensing-purpose beam measurement configuration to the sensing node enabling the sensing node to select, from a plurality of received sensing-purpose beams, one or more sensing-purpose beams, and may include the external interface 1210, along with one or more processors 1202 with dedicated hardware or implementing executable code or software instructions in memory 1204 and/or medium 1220 in network node 1200, such as the sensing configuration module 1222, shown in FIG. 12.

At block 1406, the network node receives a sensing-purpose beam measurement report from the sensing node, the sensing-purpose beam measurement report comprising at least an identification of each of one or more selected sensing-purpose beams, e.g., as discussed in stage 4 of FIG. 7. A means for receiving a sensing-purpose beam measurement report from the sensing node, the sensing-purpose beam measurement report comprising at least an identification of each of one or more selected sensing-purpose beams may include the external interface 1210, along with one or more processors 1202 with dedicated hardware or implementing executable code or software instructions in memory 1204 and/or medium 1220 in network node 1200, such as the report module 1224, shown in FIG. 12.

In one implementation, the sensing-purpose beam measurement configuration may include at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof, e.g., as discussed in stage 1 of FIG. 7. For example, in one implementation, the resources for the sensing-purpose beams may include a sensing signal resource set, wherein each sensing signal resource in the sensing signal resource set comprises a sensing-purpose beam, e.g., as discussed in stage 1 of FIG. 7. In one implementation, the measurement metrics for measuring the sensing-purpose beams may include identification of at least one of sensing Reference Signal Received Power (RSRP) or sensing Signal-to-Interference-plus-Noise ratio (SINR), e.g., as discussed in stage 1 of FIG. 7. In one implementation, the criterion for target path determination comprises at least one of a largest power non-line of sight (NLOS) path, a Doppler frequency signature, or a combination thereof, e.g., as discussed in stage 1 of FIG. 7. In one implementation, the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to the LOS path, a relative delay with respect to the LOS path, or any combination thereof, e.g., as discussed in stage 1 of FIG. 7.

In one implementation, the sensing-purpose beam measurement report may include the identification of a sensing-purpose beam associated with each selected target path, and a measurement metric and delay associated with each selected target path, e.g., as discussed in stage 4 of FIG. 7.

In one implementation, the network node in the wireless network may be one of a transmitting base station, such as a base station 102, network node 602, or a server, such as sensing server 172; and the sensing node in the wireless network may be one of a sensing base station, such as base station 102 or network node 602, and a user equipment (UE), such as UE 104 or sensing node 604.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a sensing node in a wireless network for supporting radio frequency (RF) sensing a target in the wireless network, comprising: receiving from a network node in the wireless network a sensing-purpose beam measurement configuration; measuring a plurality of sensing-purpose beams received from a transmitting entity; selecting one or more sensing-purpose beams for sensing the target from the plurality of sensing-purpose beams based on at least the sensing-purpose beam measurement configuration; and sending a sensing-purpose beam measurement report to the network node or a different network node, the sensing-purpose beam measurement report comprising at least an identification of each of the one or more selected sensing-purpose beams.

Clause 2. The method of clause 1, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

Clause 3. The method of clause 2, wherein the resources for the sensing-purpose beams comprises a sensing signal resource set, wherein each sensing signal resource in the sensing signal resource set comprises a sensing-purpose beam.

Clause 4. The method of any of clauses 2-3, wherein the measurement metrics for measuring the sensing-purpose beams comprises identification of at least one of sensing Reference Signal Received Power (RSRP) or sensing Signal-to-Interference-plus-Noise ratio (SINR).

Clause 5. The method of any of clauses 2-4, wherein the criterion for target path determination comprises at least one of a largest power non-line of sight (NLOS) path, a Doppler frequency signature, or a combination thereof.

Clause 6. The method of any of clauses 2-5, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to a transmission time of the sensing-purpose beam, a relative delay with respect to the LOS path, or any combination thereof.

Clause 7. The method of any of clauses 1-6, wherein measuring the plurality of sensing-purpose beams received from the transmitting entity comprises: receiving each of the sensing-purpose beams; identifying one or more paths comprising line of sight (LOS) path and non-LOS (NLOS) paths in each of the sensing-purpose beams based on delay; determining one or more target paths from identified one or more paths in each of the sensing-purpose beams; and determining a measurement metric and the delay for the one or more target paths.

Clause 8. The method of clause 7, wherein determining the one or more target paths comprises matching a Doppler frequency signature in NLOS paths to a configured Doppler frequency signature for the target.

Clause 9. The method of any of clauses 7-8, wherein determining the one or more target paths comprises: detecting delays in background paths in each of the sensing-purpose beams without the target being present; and determining the one or more target paths based at least partially on the one or more paths in each of the sensing-purpose beams with the delay that is not equal to the delays in the background paths.

Clause 10. The method of any of clauses 7-9, wherein determining the one or more target paths comprises: receiving an indication of a minimum delay for a target path; determining the one or more target paths based at least partially on the one or more paths in each of the sensing-purpose beams with the delay that is greater than the minimum delay.

Clause 11. The method of any of clauses 7-10, wherein determining the measurement metric for each target path associated with a sensing-purpose beam comprises: determining an indication of signal strength for only the target path that excludes the LOS path and non-LOS paths unassociated with the target.

Clause 12. The method of any of clauses 7-11, wherein determining the delay for each target path associated with a sensing-purpose beam comprises: determining one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam.

Clause 13. The method of any of clauses 7-12, wherein selecting the one or more sensing-purpose beams for sensing the target from the plurality of sensing-purpose beams based on at least the sensing-purpose beam measurement configuration comprises: selecting a configured number of target paths based on the measurement metric for each of the one or more target paths.

Clause 14. The method of clause 13, wherein the sensing-purpose beam measurement report comprises the identification of a sensing-purpose beam associated with each selected target path, and the measurement metric and the delay associated with each selected target path.

Clause 15. The method of clause 14, wherein the delay associated with at least one selected target path is a relative delay of the selected target path with respect to the LOS path of a different sensing-purpose beam, and wherein the sensing-purpose beam measurement report further comprises an identification of the different sensing-purpose beam.

Clause 16. The method of any of clauses 1-15, further comprising: receiving a valid reporting configuration; determining whether a valid reporting condition is present based at least in part on the valid reporting configuration and a change in channel state information in measurements of the plurality of sensing-purpose beams with respect to a previous measurements of the plurality of sensing-purpose beams; wherein the sensing-purpose beam measurement report is sent if the valid reporting condition is present.

Clause 17. The method of clause 16, wherein the valid reporting configuration comprises a channel state information change metric comprising at least one of a Channel Quality Indicator (CQI), Reference Signal Received Power (RSRP), or Precoding Matrix Indicator (PMI).

Clause 18. The method of any of clauses 16-17, wherein determining whether the valid reporting condition is present comprises: determining the change in the channel state information in measurements of the plurality of sensing-purpose beams with respect to the previous measurements of the plurality of sensing-purpose beams; and determining whether the change in the channel state information is greater than a threshold.

Clause 19. The method of any of clauses 1-18, wherein the sensing node in the wireless network comprises one of a sensing base station and a user equipment (UE), the network node in the wireless network comprises one of a transmitting base station and a server, and the different network node comprises one of the transmitting base station and the server.

Clause 20. A sensing node in a wireless network configured for supporting radio frequency (RF) sensing a target in the wireless network, comprising: a wireless transceiver configured to communicate with entities in the wireless network; at least one memory; and at least one processor coupled to the wireless transceiver and the at least one memory and configured to: receive, via the wireless transceiver, from a network node in the wireless network a sensing-purpose beam measurement configuration; measure a plurality of sensing-purpose beams received from a transmitting entity; select one or more sensing-purpose beams for sensing the target from the plurality of sensing-purpose beams based on at least the sensing-purpose beam measurement configuration; and send, via the wireless transceiver, a sensing-purpose beam measurement report to the network node or a different network node, the sensing-purpose beam measurement report comprising at least an identification of each of the one or more selected sensing-purpose beams.

Clause 21. The sensing node of clause 20, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

Clause 22. The sensing node of clause 21, wherein the resources for the sensing-purpose beams comprises a sensing signal resource set, wherein each sensing signal resource in the sensing signal resource set comprises a sensing-purpose beam.

Clause 23. The sensing node of any of clauses 21-22, wherein the measurement metrics for measuring the sensing-purpose beams comprises identification of at least one of sensing Reference Signal Received Power (RSRP) or sensing Signal-to-Interference-plus-Noise ratio (SINR).

Clause 24. The sensing node of any of clauses 21-23, wherein the criterion for target path determination comprises at least one of a largest power non-line of sight (NLOS) path, a Doppler frequency signature, or a combination thereof.

Clause 25. The sensing node of any of clauses 21-24, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to a transmission time of the sensing-purpose beam, a relative delay with respect to the LOS path, or any combination thereof.

Clause 26. The sensing node of clause 20, wherein the at least one processor is configured to measure the plurality of sensing-purpose beams received from the transmitting entity by being configured to: receive, via the wireless transceiver, each of the sensing-purpose beams; identify one or more paths comprising line of sight (LOS) path and non-LOS (NLOS) paths in each of the sensing-purpose beams based on delay; determine one or more target paths from identified one or more paths in each of the sensing-purpose beams; and determine a measurement metric and the delay for the one or more target paths.

Clause 27. The sensing node of clause 26, wherein the at least one processor is configured to determine the one or more target paths by being configured to match a Doppler frequency signature in NLOS paths to a configured Doppler frequency signature for the target.

Clause 28. The sensing node of any of clauses 26-27, wherein the at least one processor is configured to determine the one or more target paths by being configured to: detect delays in background paths in each of the sensing-purpose beams without the target being present; and determine the one or more target paths based at least partially on the one or more paths in each of the sensing-purpose beams with the delay that is not equal to the delays in the background paths.

Clause 29. The sensing node of any of clauses 26-28, wherein the at least one processor is configured to determine the one or more target paths by being configured to: receive, via the wireless transceiver, an indication of a minimum delay for a target path; determine the one or more target paths based at least partially on the one or more paths in each of the sensing-purpose beams with the delay that is greater than the minimum delay.

Clause 30. The sensing node of any of clauses 26-29, wherein the at least one processor is configured to determine the measurement metric for each target path associated with a sensing-purpose beam by being configured to: determine an indication of signal strength for only the target path that excludes the LOS path and non-LOS paths unassociated with the target.

Clause 31. The sensing node of any of clauses 26-30, wherein the at least one processor is configured to determine the delay for each target path associated with a sensing-purpose beam by being configured to: determine one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam.

Clause 32. The sensing node of any of clauses 26-31, wherein the at least one processor is configured to select the one or more sensing-purpose beams for sensing the target from the plurality of sensing-purpose beams based on at least the sensing-purpose beam measurement configuration by being configured to: select a configured number of target paths based on the measurement metric for each of the one or more target paths.

Clause 33. The sensing node of clause 32, wherein the sensing-purpose beam measurement report comprises the identification of a sensing-purpose beam associated with each selected target path, and the measurement metric and the delay associated with each selected target path.

Clause 34. The sensing node of clause 33, wherein the delay associated with at least one selected target path is a relative delay of the selected target path with respect to the LOS path of a different sensing-purpose beam, and wherein the sensing-purpose beam measurement report further comprises an identification of the different sensing-purpose beam.

Clause 35. The sensing node of any of clauses 20-34, wherein the at least one processor is further configured to: receive, via the wireless transceiver, a valid reporting configuration; determine whether a valid reporting condition is present based at least in part on the valid reporting configuration and a change in channel state information in measurements of the plurality of sensing-purpose beams with respect to a previous measurements of the plurality of sensing-purpose beams; wherein the sensing-purpose beam measurement report is sent if the valid reporting condition is present.

Clause 36. The sensing node of clause 35, wherein the valid reporting configuration comprises a channel state information change metric comprising at least one of a Channel Quality Indicator (CQI), Reference Signal Received Power (RSRP), or Precoding Matrix Indicator (PMI).

Clause 37. The sensing node of any of clauses 35-36, wherein the at least one processor is configured to determine whether the valid reporting condition is present by being configured to: determine the change in the channel state information in measurements of the plurality of sensing-purpose beams with respect to the previous measurements of the plurality of sensing-purpose beams; and determine whether the change in the channel state information is greater than a threshold.

Clause 38. The sensing node of any of clauses 20-37, wherein the sensing node in the wireless network comprises one of a sensing base station and a user equipment (UE), the network node in the wireless network comprises one of a transmitting base station and a server, and the different network node comprises one of the transmitting base station and the server.

Clause 39. A sensing node in a wireless network configured for supporting radio frequency (RF) sensing a target in the wireless network, comprising: means for receiving from a network node in the wireless network a sensing-purpose beam measurement configuration; means for measuring a plurality of sensing-purpose beams received from a transmitting entity; means for selecting one or more sensing-purpose beams for sensing the target from the plurality of sensing-purpose beams based on at least the sensing-purpose beam measurement configuration; and means for sending a sensing-purpose beam measurement report to the network node or a different network node, the sensing-purpose beam measurement report comprising at least an identification of each of the one or more selected sensing-purpose beams.

Clause 40. A non-transitory storage medium including program code stored thereon, the program code is operable to configure at least one processor in a sensing node in a wireless network for supporting radio frequency (RF) sensing a target in the wireless network, the program code comprising instructions to: receive from a network node in the wireless network a sensing-purpose beam measurement configuration; measure a plurality of sensing-purpose beams received from a transmitting entity; select one or more sensing-purpose beams for sensing the target from the plurality of sensing-purpose beams based on at least the sensing-purpose beam measurement configuration; and send a sensing-purpose beam measurement report to the network node or a different network node, the sensing-purpose beam measurement report comprising at least an identification of each of the one or more selected sensing-purpose beams.

Clause 41. A method performed by a network node in a wireless network for supporting radio frequency (RF) sensing a target in the wireless network, comprising: generating sensing-purpose beam measurement configuration for a sensing node in the wireless network; sending the sensing-purpose beam measurement configuration to the sensing node enabling the sensing node to select, from a plurality of received sensing-purpose beams, one or more sensing-purpose beams; and receiving a sensing-purpose beam measurement report from the sensing node, the sensing-purpose beam measurement report comprising at least an identification of each of one or more selected sensing-purpose beams.

Clause 42. The method of clause 41, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

Clause 43. The method of clause 42, wherein the resources for the sensing-purpose beams comprises a sensing signal resource set, wherein each sensing signal resource in the sensing signal resource set comprises a sensing-purpose beam.

Clause 44. The method of any of clauses 42-43, wherein the measurement metrics for measuring the sensing-purpose beams comprises identification of at least one of sensing Reference Signal Received Power (RSRP) or sensing Signal-to-Interference-plus-Noise ratio (SINR).

Clause 45. The method of any of clauses 42-44, wherein the criterion for target path determination comprises at least one of a largest power non-line of sight (NLOS) path, a Doppler frequency signature, or a combination thereof.

Clause 46. The method of any of clauses 42-45, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to the LOS path, a relative delay with respect to the LOS path, or any combination thereof.

Clause 47. The method of any of clauses 41-46, wherein the sensing-purpose beam measurement report comprises the identification of a sensing-purpose beam associated with each selected target path, and a measurement metric and delay associated with each selected target path.

Clause 48. The method of any of clauses 41-47, wherein the network node in the wireless network comprises one of a transmitting base station and a server, and the sensing node in the wireless network comprises one of a sensing base station and a user equipment (UE).

Clause 49. A network node in a wireless network configured for supporting radio frequency (RF) sensing a target in the wireless network, comprising: an external interface configured to communicate with entities in the wireless network; at least one memory; and at least one processor coupled to the external interface and the at least one memory and configured to: generate sensing-purpose beam measurement configuration for a sensing node in the wireless network; send, via the external interface, the sensing-purpose beam measurement configuration to the sensing node enabling the sensing node to select, from a plurality of received sensing-purpose beams, one or more sensing-purpose beams; and receive, via the external interface, a sensing-purpose beam measurement report from the sensing node, the sensing-purpose beam measurement report comprising at least an identification of each of one or more selected sensing-purpose beams.

Clause 50. The network node of clause 49, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

Clause 51. The network node of clause 50, wherein the resources for the sensing-purpose beams comprises a sensing signal resource set, wherein each sensing signal resource in the sensing signal resource set comprises a sensing-purpose beam.

Clause 52. The network node of any of clauses 50-51, wherein the measurement metrics for measuring the sensing-purpose beams comprises identification of at least one of sensing Reference Signal Received Power (RSRP) or sensing Signal-to-Interference-plus-Noise ratio (SINR).

Clause 53. The network node of any of clauses 50-52, wherein the criterion for target path determination comprises at least one of a largest power non-line of sight (NLOS) path, a Doppler frequency signature, or a combination thereof.

Clause 54. The network node of any of clauses 50-53, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to the LOS path, a relative delay with respect to the LOS path, or any combination thereof.

Clause 55. The network node of any of clauses 49-54, wherein the sensing-purpose beam measurement report comprises the identification of a sensing-purpose beam associated with each selected target path, and a measurement metric and delay associated with each selected target path.

Clause 56. The network node of any of clauses 49-55, wherein the network node in the wireless network comprises one of a transmitting base station and a server, and the sensing node in the wireless network comprises one of a sensing base station and a user equipment (UE).

Clause 57. A network node in a wireless network configured for supporting radio frequency (RF) sensing a target in the wireless network, comprising: means for generating sensing-purpose beam measurement configuration for a sensing node in the wireless network; means for sending the sensing-purpose beam measurement configuration to the sensing node enabling the sensing node to select, from a plurality of received sensing-purpose beams, one or more sensing-purpose beams; and means for receiving a sensing-purpose beam measurement report from the sensing node, the sensing-purpose beam measurement report comprising at least an identification of each of one or more selected sensing-purpose beams.

Clause 58. A non-transitory storage medium including program code stored thereon, the program code is operable to configure at least one processor in a network node in a wireless network for supporting radio frequency (RF) sensing a target in the wireless network, the program code comprising instructions to: generate sensing-purpose beam measurement configuration for a sensing node in the wireless network; send the sensing-purpose beam measurement configuration to the sensing node enabling the sensing node to select, from a plurality of received sensing-purpose beams, one or more sensing-purpose beams; and receive a sensing-purpose beam measurement report from the sensing node, the sensing-purpose beam measurement report comprising at least an identification of each of one or more selected sensing-purpose beams.

Therefore, it is intended that claimed subject matter not be limited to the particular examples disclosed, but that such claimed subject matter may also include all aspects falling within the scope of appended claims, and equivalents thereof.

What is claimed is:

1. A method performed by a sensing node in a wireless network for supporting radio frequency (RF) sensing a target in the wireless network, comprising:

receiving from a network node in the wireless network a sensing-purpose beam measurement configuration;

measuring a plurality of sensing-purpose beams received from a transmitting entity;

selecting one or more sensing-purpose beams for sensing the target from the plurality of sensing-purpose beams based on at least the sensing-purpose beam measurement configuration; and sending a sensing-purpose beam measurement report to the network node or a different network node, the sensing-purpose beam measurement report comprising at least an identification of each of the one or more selected sensing-purpose beams.

2. The method of claim 1, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

3. The method of claim 2, wherein the resources for the sensing-purpose beams comprises a sensing signal resource set, wherein each sensing signal resource in the sensing signal resource set comprises a sensing-purpose beam.

4. The method of claim 2, wherein the measurement metrics for measuring the sensing-purpose beams comprises identification of at least one of sensing Reference Signal Received Power (RSRP) or sensing Signal-to-Interference-plus-Noise ratio (SINR).

5. The method of claim 2, wherein the criterion for target path determination comprises at least one of a largest power non-line of sight (NLOS) path, a Doppler frequency signature, or a combination thereof.

6. The method of claim 2, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to a transmission time of the sensing-purpose beam, a relative delay with respect to the LOS path, or any combination thereof.

7. The method of claim 1, wherein measuring the plurality of sensing-purpose beams received from the transmitting entity comprises:

receiving each of the sensing-purpose beams;

identifying one or more paths comprising line of sight (LOS) path and non-LOS (NLOS) paths in each of the sensing-purpose beams based on delay;

determining one or more target paths from identified one or more paths in each of the sensing-purpose beams; and determining a measurement metric and the delay for the one or more target paths.

8. The method of claim 7, wherein determining the one or more target paths comprises matching a Doppler frequency signature in NLOS paths to a configured Doppler frequency signature for the target.

9. The method of claim 7, wherein determining the one or more target paths comprises:

receiving an indication of a minimum delay for a target path;

determining the one or more target paths based at least partially on the one or more paths in each of the sensing-purpose beams with the delay that is greater than the minimum delay.

10. The method of claim 7, wherein determining the measurement metric for each target path associated with a sensing-purpose beam comprises:

determining an indication of signal strength for only the target path that excludes the LOS path and non-LOS paths unassociated with the target.

11. The method of claim 7, wherein determining the delay for each target path associated with a sensing-purpose beam comprises:

determining one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam.

12. The method of claim 1, further comprising:

receiving a valid reporting configuration;

determining whether a valid reporting condition is present based at least in part on the valid reporting configuration and a change in channel state information in measurements of the plurality of sensing-purpose beams with respect to a previous measurements of the plurality of sensing-purpose beams;

wherein the sensing-purpose beam measurement report is sent if the valid reporting condition is present.

13. The method of claim 12, wherein the valid reporting configuration comprises a channel state information change metric comprising at least one of a Channel Quality Indicator (CQI), Reference Signal Received Power (RSRP), or Precoding Matrix Indicator (PMI).

14. The method of claim 12, wherein determining whether the valid reporting condition is present comprises:

determining the change in the channel state information in measurements of the plurality of sensing-purpose beams with respect to the previous measurements of the plurality of sensing-purpose beams; and determining whether the change in the channel state information is greater than a threshold.

15. A sensing node in a wireless network configured for supporting radio frequency (RF) sensing a target in the wireless network, comprising:

a wireless transceiver configured to communicate with entities in the wireless network;

at least one memory; and at least one processor coupled to the wireless transceiver and the at least one memory and configured to:

receive, via the wireless transceiver, from a network node in the wireless network a sensing-purpose beam measurement configuration;

measure a plurality of sensing-purpose beams received from a transmitting entity;

select one or more sensing-purpose beams for sensing the target from the plurality of sensing-purpose beams based on at least the sensing-purpose beam measurement configuration; and send, via the wireless transceiver, a sensing-purpose beam measurement report to the network node or a different network node, the sensing-purpose beam measurement report comprising at least an identification of each of the one or more selected sensing-purpose beams.

16. The sensing node of claim 15, wherein the sensing-purpose beam measurement configuration comprises at least one of resources for sensing-purpose beams, measurement metrics for measuring the sensing-purpose beams, criterion for target path determination, a minimum absolute or relative delay with respect to a line of sight (LOS) path for the target path determination, a quantity of target paths to be included in the sensing-purpose beam measurement report, a report format for each of the one or more selected sensing-purpose beams, and any combination thereof.

17. The sensing node of claim 16, wherein the resources for the sensing-purpose beams comprises a sensing signal resource set, wherein each sensing signal resource in the sensing signal resource set comprises a sensing-purpose beam.

18. The sensing node of claim 16, wherein the measurement metrics for measuring the sensing-purpose beams comprises identification of at least one of sensing Reference Signal Received Power (RSRP) or sensing Signal-to-Interference-plus-Noise ratio (SINR).

19. The sensing node of claim 16, wherein the criterion for target path determination comprises at least one of a largest power non-line of sight (NLOS) path, a Doppler frequency signature, or a combination thereof.

20. The sensing node of claim 16, wherein the report format for each of the one or more selected sensing-purpose beams comprises a sensing signal resource identifier (ID), at least one of a sensing Reference Signal Received Power (RSRP), a sensing Signal-to-Interference-plus-Noise ratio (SINR), an absolute delay with respect to a transmission time of the sensing-purpose beam, a relative delay with respect to the LOS path, or any combination thereof.

21. The sensing node of claim 15, wherein the at least one processor is configured to measure the plurality of sensing-purpose beams received from the transmitting entity by being configured to:

receive, via the wireless transceiver, each of the sensing-purpose beams;

identify one or more paths comprising line of sight (LOS) path and non-LOS (NLOS) paths in each of the sensing-purpose beams based on delay;

determine one or more target paths from identified one or more paths in each of the sensing-purpose beams; and determine a measurement metric and the delay for the one or more target paths.

22. The sensing node of claim 21, wherein the at least one processor is configured to determine the one or more target paths by being configured to match a Doppler frequency signature in NLOS paths to a configured Doppler frequency signature for the target.

23. The sensing node of claim 21, wherein the at least one processor is configured to determine the one or more target paths by being configured to:

receive, via the wireless transceiver, an indication of a minimum delay for a target path;

determine the one or more target paths based at least partially on the one or more paths in each of the sensing-purpose beams with the delay that is greater than the minimum delay.

24. The sensing node of claim 21, wherein the at least one processor is configured to determine the measurement metric for each target path associated with a sensing-purpose beam by being configured to:

determine an indication of signal strength for only the target path that excludes the LOS path and non-LOS paths unassociated with the target.

25. The sensing node of claim 21, wherein the at least one processor is configured to determine the delay for each target path associated with a sensing-purpose beam by being configured to:

determine one of an absolute delay of the target path with respect to a time of transmission of the sensing-purpose beam, a relative delay of the target path with respect to the LOS path of the sensing-purpose beam, or a relative delay of the target path with respect to the LOS path of a different sensing-purpose beam.

26. The sensing node of claim 15, wherein the at least one processor is further configured to:

receive, via the wireless transceiver, a valid reporting configuration;

determine whether a valid reporting condition is present based at least in part on the valid reporting configuration and a change in channel state information in measurements of the plurality of sensing-purpose beams with respect to a previous measurements of the plurality of sensing-purpose beams;

wherein the sensing-purpose beam measurement report is sent if the valid reporting condition is present.

27. The sensing node of claim 26, wherein the valid reporting configuration comprises a channel state information change metric comprising at least one of a Channel Quality Indicator (CQI), Reference Signal Received Power (RSRP), or Precoding Matrix Indicator (PMI).

28. The sensing node of claim 26, wherein the at least one processor is configured to determine whether the valid reporting condition is present by being configured to:

determine the change in the channel state information in measurements of the plurality of sensing-purpose beams with respect to the previous measurements of the plurality of sensing-purpose beams; and determine whether the change in the channel state information is greater than a threshold.

29. A sensing node in a wireless network configured for supporting radio frequency (RF) sensing a target in the wireless network, comprising:

means for receiving from a network node in the wireless network a sensing-purpose beam measurement configuration;

means for measuring a plurality of sensing-purpose beams received from a transmitting entity;

means for selecting one or more sensing-purpose beams for sensing the target from the plurality of sensing-purpose beams based on at least the sensing-purpose beam measurement configuration; and means for sending a sensing-purpose beam measurement report to the network node or a different network node, the sensing-purpose beam measurement report comprising at least an identification of each of the one or more selected sensing-purpose beams.

30. A non-transitory storage medium including program code stored thereon, the program code is operable to configure at least one processor in a sensing node in a wireless network for supporting radio frequency (RF) sensing a target in the wireless network, the program code comprising instructions to:

receive from a network node in the wireless network a sensing-purpose beam measurement configuration;

measure a plurality of sensing-purpose beams received from a transmitting entity;

select one or more sensing-purpose beams for sensing the target from the plurality of sensing-purpose beams based on at least the sensing-purpose beam measurement configuration; and send a sensing-purpose beam measurement report to the network node or a different network node, the sensing-purpose beam measurement report comprising at least an identification of each of the one or more selected sensing-purpose beams.

* * * * *